(12) United States Patent  (10) Patent No.: US 9,183,545 B2
Altberg et al.  (45) Date of Patent: Nov. 10, 2015

(54) METHODS AND APPARATUSES FOR SCHEDULING PAY-PER-CALL ADVERTISING

(75) Inventors: Ebbe Altberg, Mill Valley, CA (US); Ron Hirson, San Francisco, CA (US); Sean Van Der Linden, Berkeley, CA (US); Scott Faber, San Francisco, CA (US)

(73) Assignee: YELLOWPAGES.COM LLC

( * ) Notice: Subject to any disclaimer, the term of this patent is extended or adjusted under 35 U.S.C. 154(b) by 747 days.

(21) Appl. No.: 11/467,129

(22) Filed: Aug. 24, 2006

(65) Prior Publication Data

US 2007/0011240 A1 Jan. 11, 2007

Related U.S. Application Data

(60) Provisional application No. 60/713,686, filed on Sep. 2, 2005.

(51) Int. Cl.
*G06Q 30/00* (2012.01)
*G06Q 10/10* (2012.01)
*G06Q 10/00* (2012.01)
*G06Q 30/02* (2012.01)
*G06Q 40/00* (2012.01)
(Continued)

(52) U.S. Cl.
CPC .............. *G06Q 10/109* (2013.01); *G06Q 10/00* (2013.01); *G06Q 10/06* (2013.01); *G06Q 10/10* (2013.01); *G06Q 10/101* (2013.01); *G06Q 30/02* (2013.01); *G06Q 30/0241* (2013.01); *G06Q 30/0242* (2013.01); *G06Q 30/0244* (2013.01); *G06Q 30/0247* (2013.01); *G06Q 30/0256* (2013.01); *G06Q 30/0271* (2013.01); *G06Q 30/0272* (2013.01); *G06Q 40/00* (2013.01); *H04M 11/00* (2013.01)

(58) Field of Classification Search
CPC .......... G06Q 30/0242; G06Q 30/0244; G06Q 30/0272; G06Q 10/00; G06Q 10/06; G06Q 10/10; G06Q 10/109; A01B 12/006; H04M 11/00
USPC .............. 705/14.41, 14.43, 14.68, 7.12, 7.16; 379/201.07, 207.03; 709/204
See application file for complete search history.

(56) References Cited

U.S. PATENT DOCUMENTS

| 4,313,035 A | 1/1982 | Jordan et al. |
| 4,645,873 A | 2/1987 | Chomet |
| 4,752,675 A | 6/1988 | Zetmeir |

(Continued)

FOREIGN PATENT DOCUMENTS

WO  WO 97/40447  * 10/1997  ............. G06F 13/00

OTHER PUBLICATIONS

ISA/US, International Search Report for International Application No. PCT/US05/12061, 3 pages, Nov. 17, 2006.

(Continued)

*Primary Examiner* — Raquel Alvarez
(74) *Attorney, Agent, or Firm* — Alston & Bird LLP

(57) ABSTRACT

Methods and systems to schedule delivery of advertisements. In one embodiment, an indication of one or more periods of time during which the advertiser is callable to receive real time communications generated from advertising is received. Delivery of an advertisement for the advertiser is then managed according to the indication of one or more periods of time.

20 Claims, 28 Drawing Sheets

(51) Int. Cl.
*G06Q 10/06* (2012.01)
*H04M 11/00* (2006.01)

(56) References Cited

U.S. PATENT DOCUMENTS

| | | | |
|---|---|---|---|
| 5,574,781 A | 11/1996 | Blaze | |
| 5,589,892 A | 12/1996 | Knee et al. | |
| 5,701,419 A | 12/1997 | McConnell | |
| 5,774,534 A | 6/1998 | Mayer | |
| 5,793,851 A | 8/1998 | Albertson | |
| 5,903,877 A | 5/1999 | Berkowitz et al. | |
| 5,937,390 A | 8/1999 | Hyodo | |
| 5,960,406 A | 9/1999 | Rasansky et al. | |
| 5,970,466 A | 10/1999 | Detjen et al. | |
| 5,974,398 A | 10/1999 | Hanson et al. | |
| 6,006,197 A | 12/1999 | d-Eon et al. | |
| 6,016,478 A | 1/2000 | Zhang et al. | |
| 6,035,278 A | 3/2000 | Mansour | |
| 6,076,093 A | 6/2000 | Pickering | |
| 6,167,379 A | 12/2000 | Dean et al. | |
| 6,301,342 B1 | 10/2001 | Ander et al. | |
| 6,424,952 B1 | 7/2002 | Yinbal | |
| 6,470,079 B1 | 10/2002 | Benson | |
| 6,477,246 B1 | 11/2002 | Dolan et al. | |
| 6,484,148 B1 | 11/2002 | Boyd | |
| 6,493,437 B1 | 12/2002 | Olshansky | |
| 6,609,106 B1 | 8/2003 | Robertson | |
| 6,798,753 B1 | 9/2004 | Doganata et al. | |
| 6,917,610 B1 | 7/2005 | Kung et al. | |
| 7,039,681 B2 | 5/2006 | Nolte et al. | |
| 7,136,871 B2 * | 11/2006 | Ozer et al. | 1/1 |
| 7,383,303 B1 | 6/2008 | Bort | |
| 7,388,950 B2 | 6/2008 | Elsey et al. | |
| 8,027,878 B2 | 9/2011 | Wong et al. | |
| 2001/0027481 A1 * | 10/2001 | Whyel | 709/218 |
| 2001/0044751 A1 | 11/2001 | Pugliese et al. | |
| 2001/0048737 A1 | 12/2001 | Goldberg et al. | |
| 2002/0038293 A1 | 3/2002 | Seiden | |
| 2002/0059082 A1 | 5/2002 | Moczygemba | |
| 2002/0073207 A1 | 6/2002 | Widger et al. | |
| 2002/0091607 A1 | 7/2002 | Sloan et al. | |
| 2002/0095331 A1 | 7/2002 | Osman et al. | |
| 2002/0164977 A1 * | 11/2002 | Link, II et al. | 455/414 |
| 2002/0164997 A1 | 11/2002 | Parry | |
| 2002/0169836 A1 | 11/2002 | Hood et al. | |
| 2002/0173319 A1 | 11/2002 | Fostick | |
| 2002/0191762 A1 | 12/2002 | Benson | |
| 2003/0005126 A1 | 1/2003 | Schwartz et al. | |
| 2003/0014295 A1 | 1/2003 | Brookes et al. | |
| 2003/0046161 A1 | 3/2003 | Kamangar et al. | |
| 2003/0061094 A1 | 3/2003 | Banerjee et al. | |
| 2003/0126205 A1 | 7/2003 | Lurie | |
| 2003/0195838 A1 | 10/2003 | Henley | |
| 2003/0220866 A1 | 11/2003 | Pisaris-Henderson et al. | |
| 2004/0162757 A1 | 8/2004 | Pisaris-Henderson | |
| 2004/0254859 A1 | 12/2004 | Aslanian | |
| 2006/0069610 A1 | 3/2006 | Rossini | |
| 2006/0099936 A1 * | 5/2006 | Link et al. | 455/414.1 |
| 2006/0277181 A1 * | 12/2006 | Temple et al. | 707/9 |
| 2007/0067391 A1 | 3/2007 | Masciantonio et al. | |
| 2007/0255622 A1 * | 11/2007 | Swix et al. | 705/14 |
| 2008/0228600 A1 * | 9/2008 | Treyz et al. | 705/27 |
| 2014/0046768 A1 * | 2/2014 | Hayes | 705/14.64 |

OTHER PUBLICATIONS

"Notice from the EPO dated Oct. 1, 2007 concerning business methods," Journal of the European Patent Office, Nov. 1, 2007, vol. 30, No. 11, pp. 592-593.

European Patent Office, Extended Search Report for European Patent Application No. EP06803160.8, Feb. 2, 2011.

International Application No. PCT/US06/34948, Written Opinion and International Search Report, May 16, 2008.

USPTO Transaction History of U.S. Appl. No. 10/032,518, filed Dec. 27, 2001, entitled "Apparatus and Method for Scheduling Live Advice Communication With a Selected Service Provider."

* cited by examiner

Advertisement Publication Module

CALL HANDLING MODULE
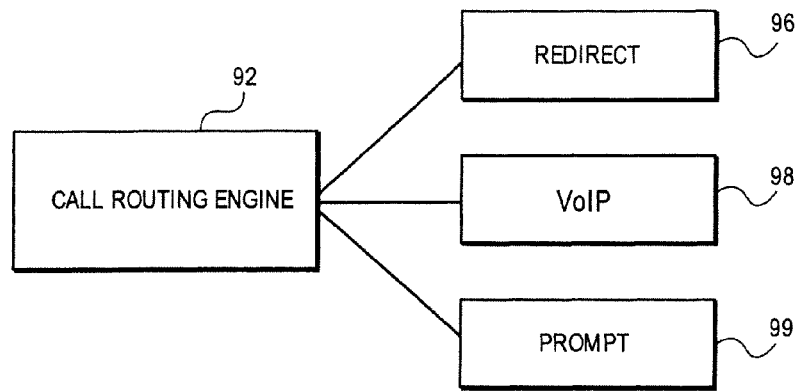
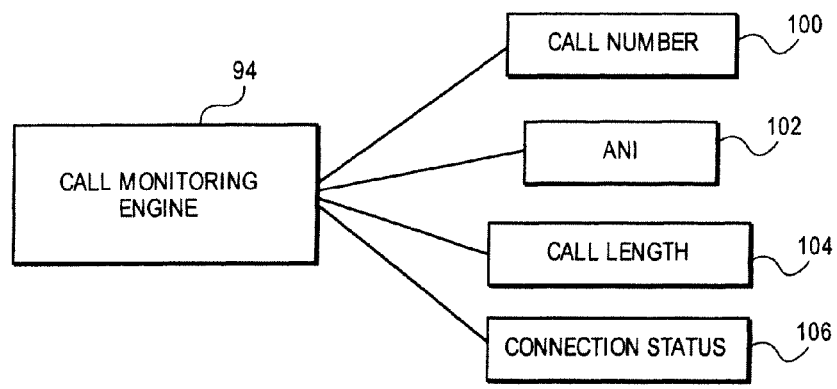
FIG. 7

— 114

SCROLL DOWN to see more listings      Refine your search by Zip Code:

Your search found 105 listings, Listings 1 to 15 listed below...

Thinking of buying a new car?
Fill out IMotors' simple online form and receive a free new car quote from a local dealer by email within 24 hours. There is no obligation and no hassle. Serious buyers only please.

FEATURED DIRECTORY LISTINGS      SCROLL DOWN for more listings
                                                                   City Gold

Dream Car Rentals
3734 Las Vegas Blvd.
LAS VEGAS, NV
Phone: (702)555-6661
Fax: (702) 555-6665
We Specialize in Excitement! Ferrari's. Viper's Porsche's &
Hummers. Harley-Davidson's and SUV's. "DRIVE THE DREAM"

City Gold

RENT-A-VETTE
5021 SWENSON STREET
LAS VEGAS, NV 89119
Phone: (702) 555-2692
Fax: (702) 555-2044

ONLINE LISTINGS      SCROLL DOWN for more listings

Expedia: For All Your Car Rental Needs http://www.expedia.com
Save with Expedia.com, your one-stop source for flights, hotels, vacation packages, cruises, and rental

FIG. 9

*ingenio*™ Pay Per Call®

Edit Ad

Edit Weekly Schedule                                                   ? Help Set Callable Hours

Set Callable Hours. Your callable hours control when your ad is displayed to potential customers to prevent you from being charged for calls that are placed after hours. These callable hours are listed on your advertiser details page.  What's this

2202

| | | | | |
|---|---|---|---|---|
| Monday: | Callable from | 7:00 AM ▼ | to | 7:00 PM ▼ |
| Tuesday: | Callable from | 7:00 AM ▼ | to | 7:00 PM ▼ |
| Wednesday: | Callable from | 7:00 AM ▼ | to | 7:00 PM ▼ |
| Thursday: | Callable from | 7:00 AM ▼ | to | 7:00 PM ▼ |
| Friday: | Callable from | 7:00 AM ▼ | to | 7:00 PM ▼ |
| Saturday: | Callable from | 7:00 AM ▼ | to | 7:00 PM ▼ |
| Sunday: | Callable from | Closed ▼ | | |

Time Zone: (GMT -08:00) Pacific Time (US & Canada); Tijuana (based on zip code of 94111)

[ < Back ]   [ Continue > ]

FIG. 22

METHODS AND APPARATUSES FOR SCHEDULING PAY-PER-CALL ADVERTISING

The present application claims priority to Provisional U.S. patent application Ser. No. 60/713,686, filed Sep. 2, 2005, the disclosure of which is incorporated herein by reference.

The present patent application is related to: U.S. patent application Ser. No. 10/032,518, filed Dec. 27, 2001; U.S. patent application Ser. No. 11/077,655, filed Mar. 10, 2005 and claimed priority from Provisional U.S. patent application 60/653,708 filed on Feb. 16, 2005, Provisional U.S. patent application Ser. No. 60/568,156 filed on May 4, 2004, Provisional U.S. patent application Ser. No. 60/560,926 filed on Apr. 9, 2004 and Provisional U.S. patent application Ser. No. 60/552,124 filed on Mar. 10, 2004; U.S. patent application Ser. No. 11/092,309, filed Mar. 28, 2005 and claimed priority from Provisional U.S. patent application 60/653,660 filed on Feb. 16, 2005; U.S. patent application Ser. No. 11/095,853, filed Mar. 30, 2005 and claimed priority from Provisional U.S. patent application 60/653,661 filed on Feb. 16, 2005; and U.S. patent application Ser. No. 11/014,073, filed Dec. 15, 2004; U.S. patent application Ser. No. 10/872,117, filed Jun. 17, 2004; U.S. patent application Ser. No. 11/021,939, filed Dec. 23, 2004; U.S. patent application Ser. No. 10/679,982, filed Oct. 6, 2003. The disclosures of the above-mentioned related applications are incorporated herein by reference.

TECHNOLOGY FIELD

At least some embodiments of the present disclosure relate to providing communication connections, such as providing real time communication connections via performance-based advertising.

BACKGROUND

Telephone systems allow users to conduct real time two-way voice communication. Traditional land-line based telephone systems connect one telephone set to another through one or more switching centers, operated by one or more telephone companies, over a land-line based telephone network. Traditionally, a telephone connection is based on a circuit switched network.

Current telephone systems may also use a package switched network for a telephone connection. A package switched network is typical in a computer data environment. Recent developments in the field of Voice over IP (VoIP) allow the delivery of voice information using the Internet Protocol (IP), in which voice information is packaged in a digital form in discrete packets rather than in the traditional circuit-committed protocols of the public switched telephone network (PSTN).

Cellular networks allow a cellular phone to connect to a nearby cellular base station through an air interface for wireless access to a telephone network. Recent developments in wireless telephone systems allow not only voice communications but also data communications. For example, cellular phones can now receive and send short messages through a Short Message Service (SMS). Web pages can now be retrieved through wireless cellular links and displayed on cellular phones. Wireless Application Protocol (WAP) has been developed to overcome the constraints of relatively slow and intermittent nature of wireless links to access information similar or identical to World Wide Web.

Telephone companies provide a number of convenient features, such as call forwarding. Call forwarding of a telephone system allows a user of a phone at a given phone number to dial a specific sequence on the phone to cause the telephone system to forward incoming calls addressed to the phone number to another specified phone number indicated by the dialed sequence.

Telephone systems are frequently used in conducting business. Telephone numbers are typically provided in advertisements, web sites, directories, etc., as a type of contact information to reach businesses, experts, persons, etc.

The Internet is becoming an advertisement media to reach globally populated web users. Advertisements can be included in a web page that is frequently visited by web users. Typically, the advertisements included in the web pages contain only a limited amount of information (e.g., a small paragraph, an icon, etc.). The advertisements contain links to the web sites that provide further detailed information. In certain arrangements, the advertisers pay the advertisements based on the number of visits directed to their web sites by the links of the advertisements.

Performance based advertising generally refers to a type of advertising in which an advertiser pays only for a measurable event that is a direct result of an advertisement being viewed by a customer. For example, paid inclusion advertising is a form of performance-based search advertising. With paid inclusion advertising, an advertisement is included within a search result page of a key word search. Each selection ("click") of the advertisement from the results page is the measurable event for which the advertiser pays. In other words, payment by the advertiser is on a per click basis.

Another form of performance-based advertising includes paid placement advertising. Paid placement advertising is similar to paid inclusion advertising in that payment is on a per click basis. However, with paid placement advertising an advertiser ranks a particular advertisement so that it appears or is placed at a particular spot, e.g., at the top of a search engine result page, thereby to increase the odds of the advertisement being selected.

SUMMARY

Methods and systems to schedule delivery of advertisements are described herein. In one embodiment, an indication of one or more periods of time during which the advertiser is callable to receive real time communications generated from advertising is received. Delivery of an advertisement for the advertiser is then managed according to the indication of one or more periods of time. Other aspects are described below.

BRIEF DESCRIPTION OF THE DRAWINGS

FIG. 7 illustrates the Call Handling Module of the system.

FIG. 9 illustrates an example of a search engine result page, which includes an advertisement generated.

FIG. 22 illustrates an example of a user interface for an advertiser to set an advertisement schedule.

DETAILED DESCRIPTION

In the following description, for purposes of explanation, numerous specific details are set forth in order to provide a thorough understanding of the description. It will be apparent, however, to one skilled in the art that the embodiments disclosed herein can be practiced without these specific details. In other instances, structures and devices are shown in block diagram form in order to avoid obscuring the description.

Reference in this specification to "one embodiment" or "an embodiment" means that a particular feature, structure, or characteristic is described in connection with one or more aspects of this disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
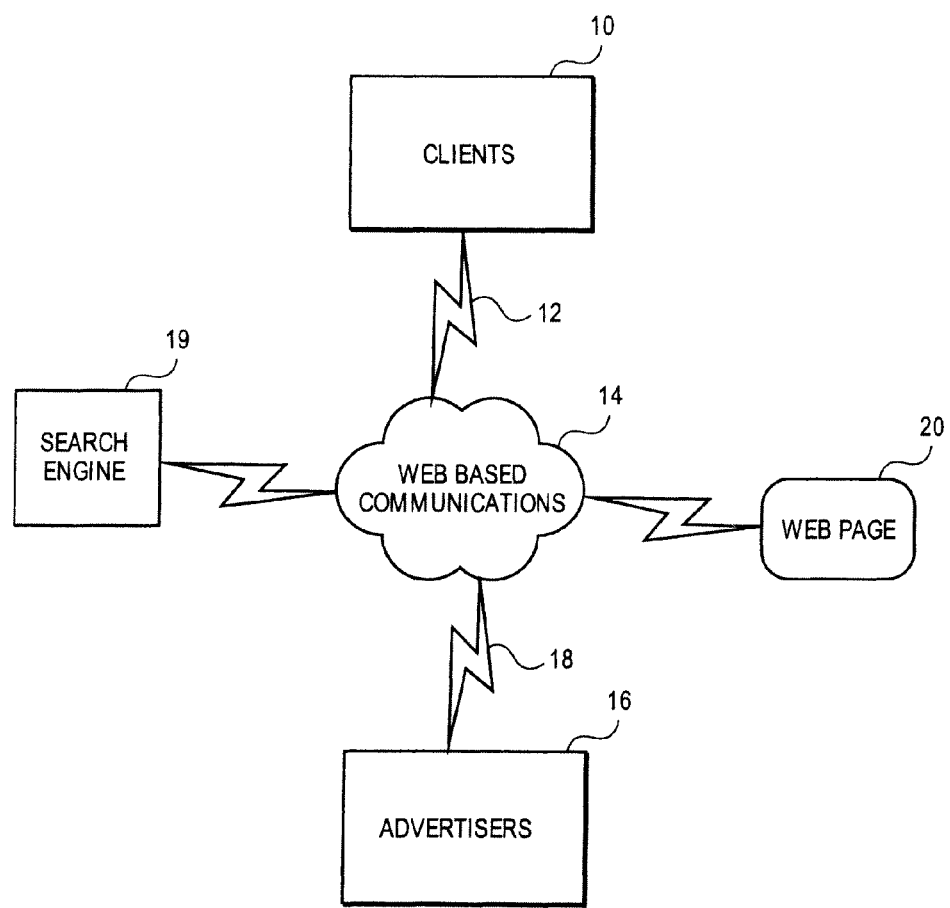
FIG. 1 shows how clients and advertisers interact with each other using a paid placement, or a paid inclusion advertising model, in accordance with the prior art.

FIG. 1 of the drawings illustrates how clients and advertisers interact with each other in accordance with the paid placement, and paid inclusion advertising models of the prior art. Referring to FIG. 1, a number of clients indicated by reference numeral 10 are coupled to a wide area network (WAN) 14, such as the Internet via a communications path 12. Advertisers 16 are coupled to the WAN 14 via a communications path 18. The communications paths 12 and 18 may support the TCP/IP protocols, in one embodiment. Each advertiser 16 has a web page 20 which in accordance with the paid placement, and paid inclusion advertising models described above, may be included in a results page of a key word search initiated by a user of a client 10, which search is performed by an online search engine 19. Based on the paid placement, or the paid inclusion models, the web page 20 of an advertiser 16 is included within a results page compiled by the search engine 19 and sent via the communications path 12 to the client 10 that initiated the search, so that the web page 20 may be selected or viewed by a user of the client 10 that requested the search. As noted above, if an advertiser 16 does not have a web page 20, or does not have a web page 20 that is effective at capturing the value of a web visitor, then currently, such an advertiser may not participate, or effectively participate, in performance-based marketing such as paid placement, and paid inclusion programs.

Figure 2:
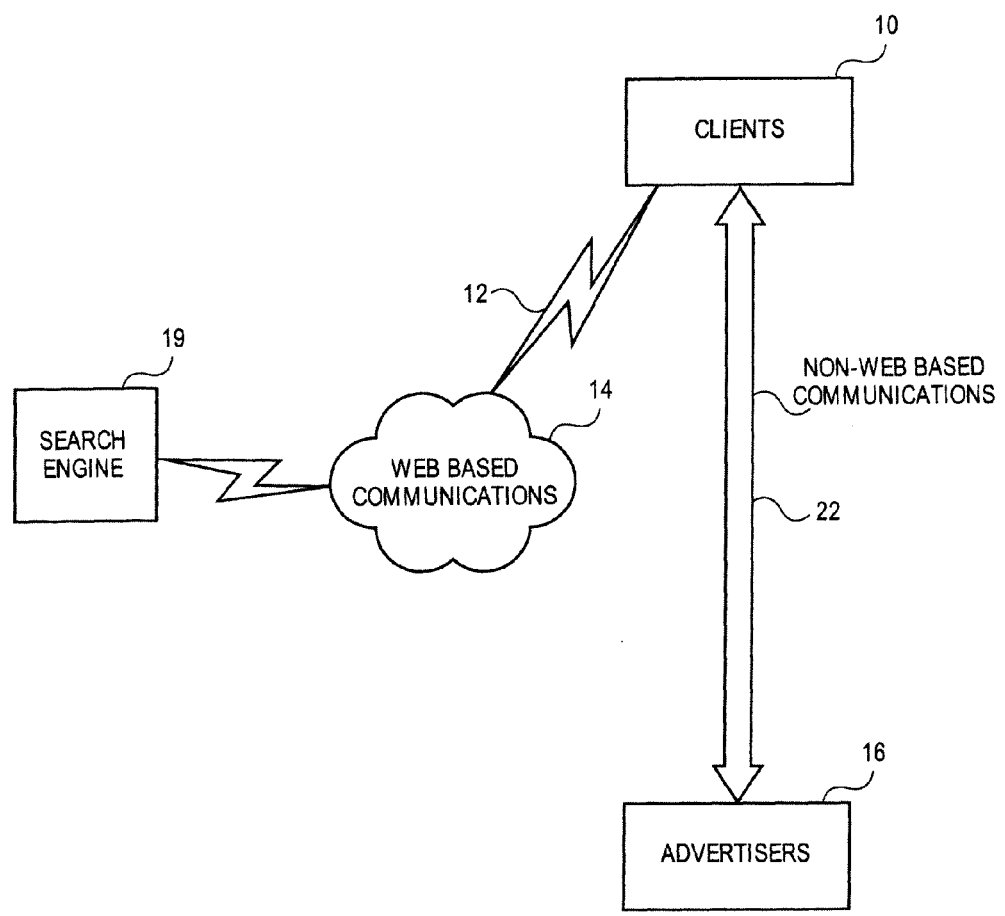
FIG. 2 illustrates an interaction between clients and advertisers.

Referring now to FIG. 2 of the drawings, a method for allowing advertisers to participate in a pay per call advertising program, without requiring that the advertisers have a web presence, in accordance with one embodiment, is illustrated. As will be seen, the clients 10 are coupled to the WAN 14 via the communications path 12, as before. However, the communications path 18 between the advertisers 16 and the WAN 14 is purely optional. In other words, embodiments of this disclosure allow an advertiser 16 to participate in a performance-based advertising program without the requirement that the advertiser 16 be coupled to the WAN 14 via the communications path 18. In fact, in accordance with the techniques disclosed herein, it is not necessary that the advertisers 16 have web pages 20. Instead, in accordance with the techniques disclosed herein, an alternative non-web based communications path 22 is provided between the clients 10 and the advertisers 16. According to some embodiments, the non-web based communications path 22 may be provided by a conventional telephone network. Alternatively, the non-web based communications path 22 may utilize Voice Over Internet Protocol (VoIP) technology to couple a client through switches of the network 14, and switches of a public telephone network, in a manner that does not require the advertisers 16 to have a connection to the network 14. In addition, the advertiser could be notified via other media channels, such as email, chat, instant message, etc.

Figure 3:
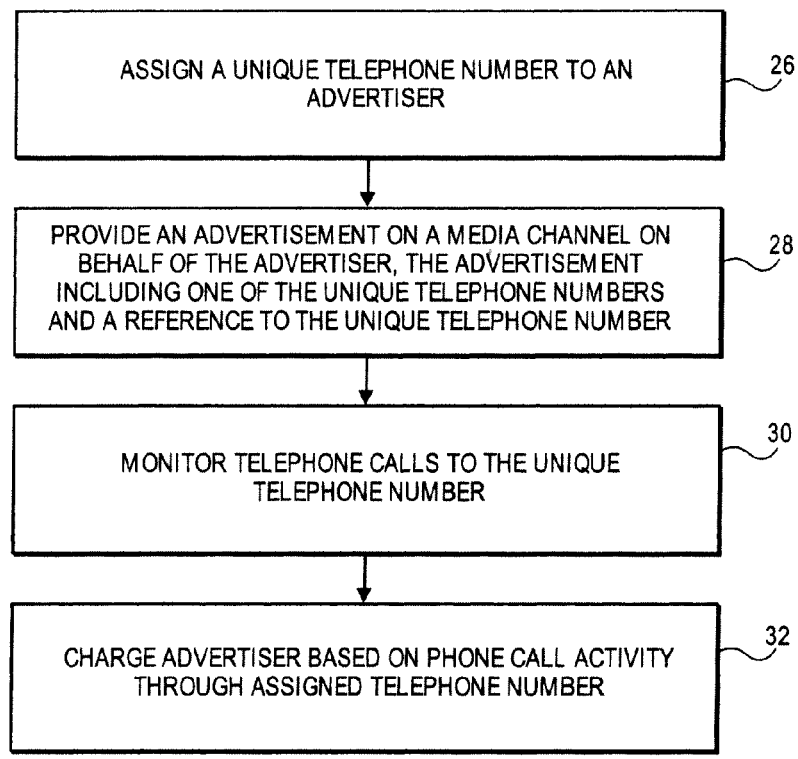
FIG. 3 illustrates a flowchart of operations performed.

FIG. 3 of the drawings illustrates a technique to establish the non-web based communications path 22 of FIG. 2, in accordance with one embodiment. Referring to FIG. 3, at block 26, a unique telephone number is assigned to an advertiser 16. Thereafter, at block 28, an advertisement associated with the advertiser 16 is provisioned or published on a publication or media channel on behalf of the advertiser. The advertisement includes either the unique telephone number, or a reference to the unique telephone number. At block 30, telephone calls to the unique telephone number are monitored, as will be described. At block 32, the advertiser is charged based on the phone call activity through the assigned telephone number, as will be described.

Further, the techniques disclosed herein are not limited to publishing or providing advertisements for the advertisers 16 through web pages. Thus, in alternative embodiments, the unique telephone number assigned to an advertiser may be published or provided using a directory without the creation of a web page for the advertiser. The directory may be an existing directory or a new directory. The placement or ranking of the telephone number within the directory may be controlled through ranking techniques described below.

Figure 4:
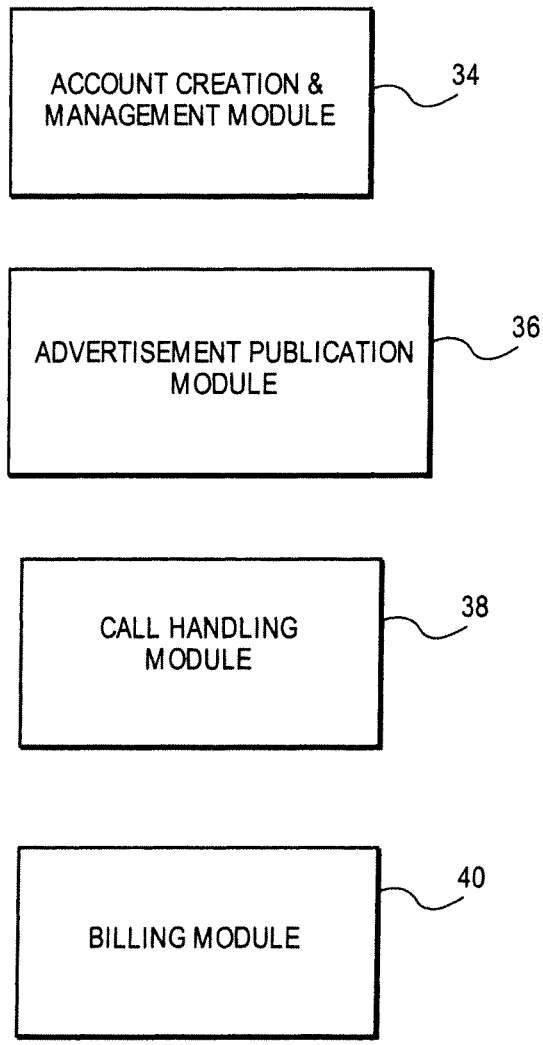
FIG. 4 illustrates a high level functional description of a system.

FIG. 4 of the drawings shows a functional description of a system to implement the method of FIG. 3 is shown. Referring to FIG. 4, the system includes account creation and management module 34, advertisement publication module 36, call handling module 38, and billing module 40. In alternative embodiments, additional, less, or different modules may be included in the system.

Figure 5:
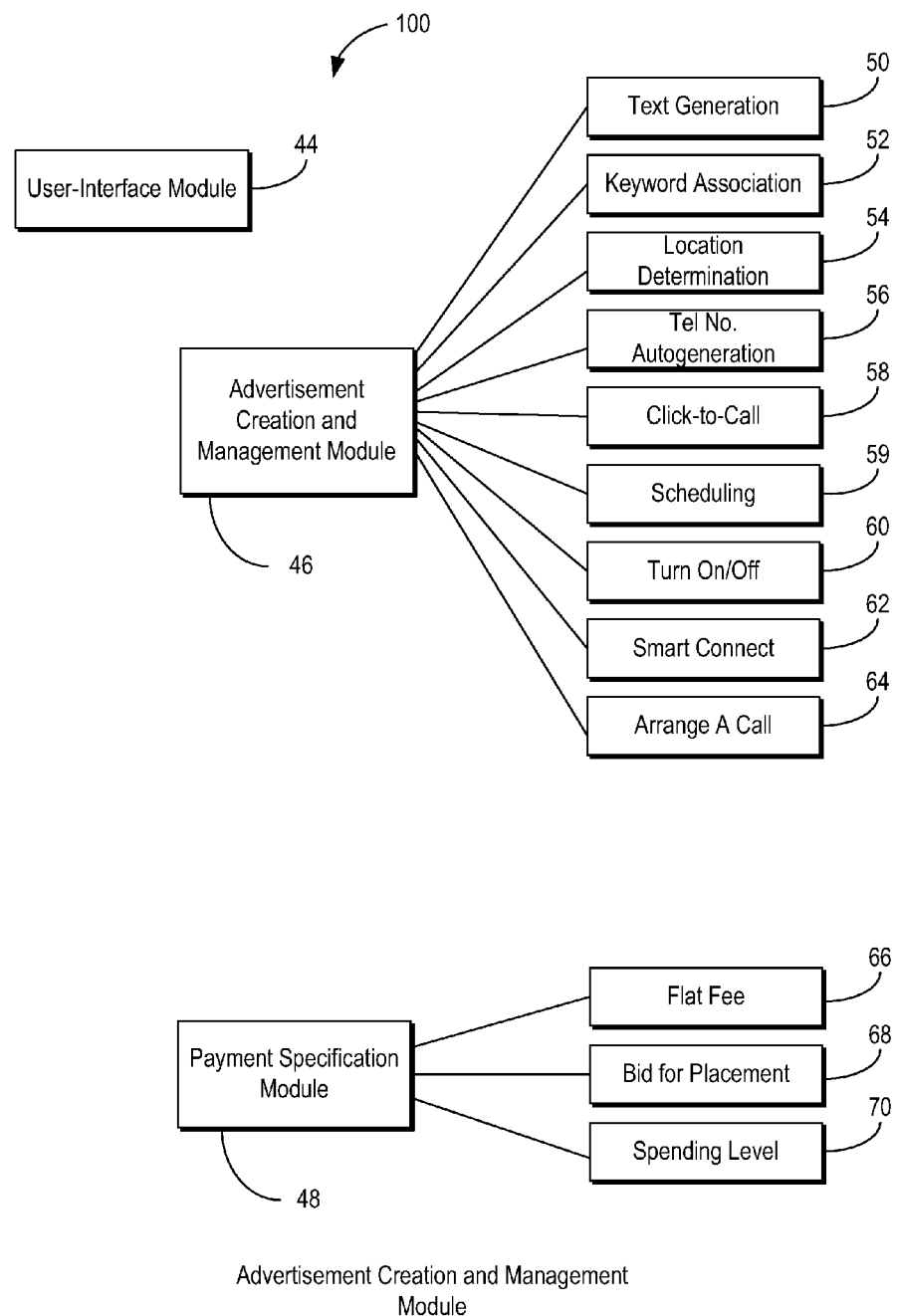
FIG. 5 illustrates elements of the account creation and management module of the system.
Figure 8A:
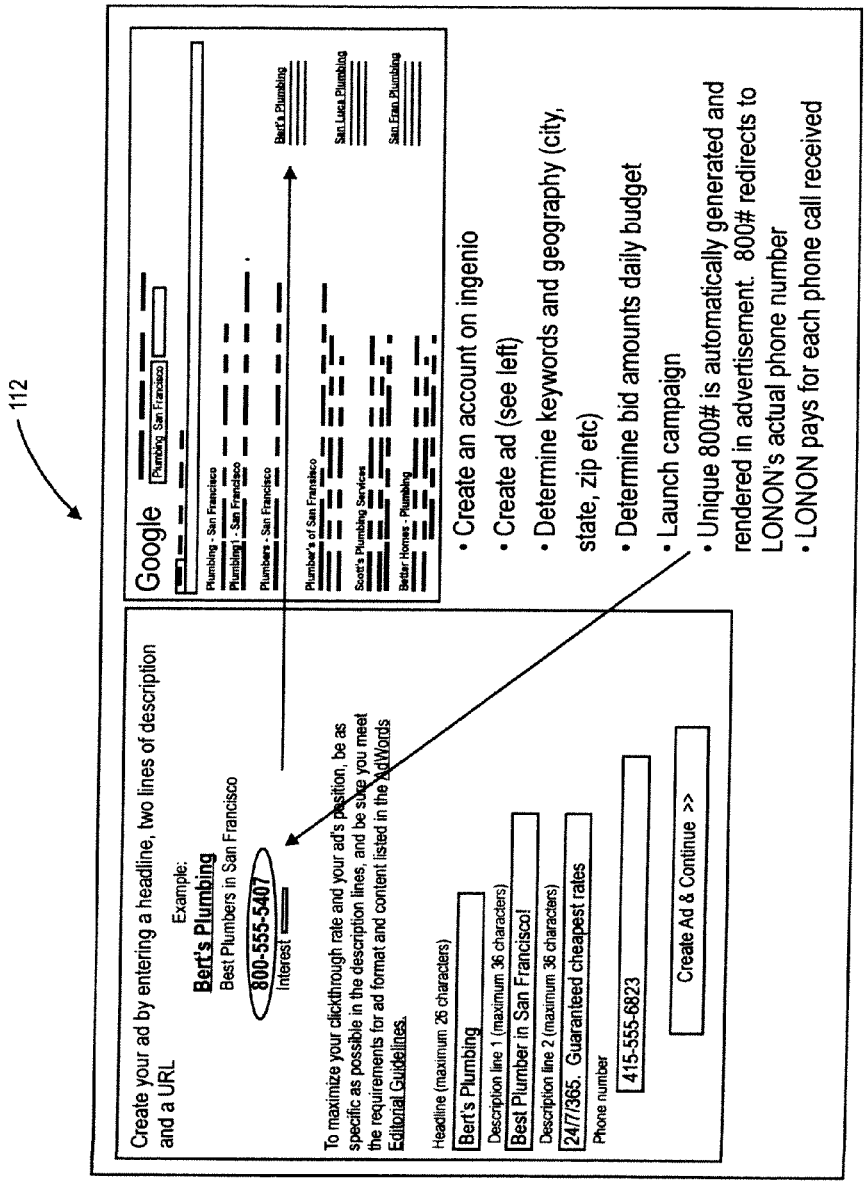
FIG. 8A illustrates an example of a user interface that may be presented to a user during advertisement creation.
Figure 8B:
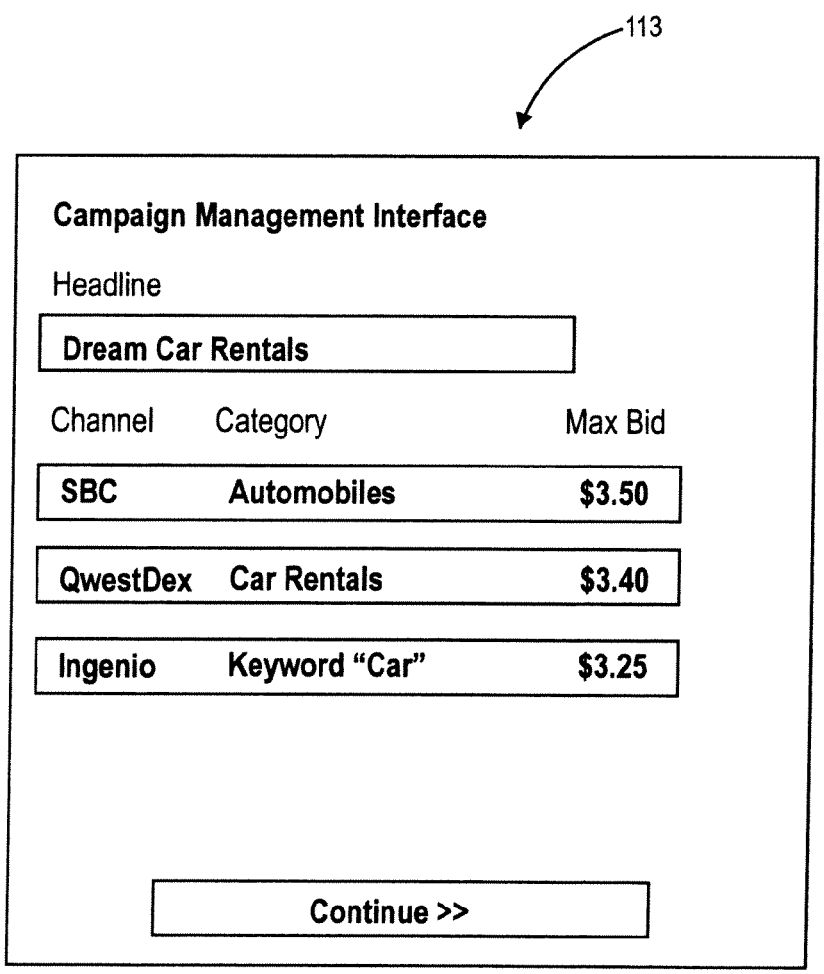
FIG. 8B illustrates a campaign management interface that is presented to a user.

The components of the account creation and management module 34, in accordance with one embodiment, are shown in more detail in FIG. 5 of the drawings. Referring to FIG. 5, it will be seen that the account creation and management module 34 includes a user interface module 44, an advertisement creation and management module 46, and a payment specification module 48. The user interface module 44 includes logic to present information to a user, and to receive information from the user. For example, in one embodiment, the user interface module 44 causes a web page such as the web page 112 of FIG. 8 to be displayed on a browser of a client.

The advertisement creation and management module 46 includes text creation logic 50. The purpose of text creation logic 50 is to allow an advertiser 16, or an agent working on behalf of an advertiser 16, to input text for an advertisement which is ultimately created by the advertisement creation and management module 46. For illustrative purposes, a local business enterprise called "Burt's Plumbing" will be used as an example of an advertiser that may benefit from the techniques disclosed herein. Burt's Plumbing may or not have direct connectivity to the network 14. If Burt's Plumbing does not have direct connectivity to the network 14, then a representative of Burt's Plumbing (hereinafter "Burt") will have to gain access to a computer that does have connectivity to the network 14 in order to view the web page 112 of FIG. 8A. For example, Burt could use a computer of a friend, a computer at a local library, etc. In another embodiment, a search operator, an Internet yellow page provider or other type of publisher could perform or administer this activity on behalf of Burt. The text creation logic 50 allows Burt to input for e.g. the text "Burt's Plumbing in San Francisco. Check out our special deals," which will be included in the advertisement when it is rendered. The module 46 also includes key word association logic 57 that allows Burt to input certain key words which are then associated with Burt's advertisement. Thus, when one of the clients 10 initiates a search through the search engine 19 using a key word that matches one of the key words entered by Burt, then Burt's advertisement can be displayed within a result of the search. Since Burt's Plumbing is not a national operation or enterprise it is necessary to display Burt's advertisement to clients within a certain geographic area. Thus, the module 46 includes location determination logic 54 that builds a geographic location association to Burt's advertisement. In one embodiment, the location determination logic 54 allows Burt to select a particular geographic location of interest, say for example San Francisco, so that Burt's advertisement can only be displayed to clients within the San Francisco area.

The module 46 also includes telephone number auto generation logic 56 that automatically generates a unique telephone number, maps the unique telephone number to Burt's actual telephone number such that when the unique number is called, Bert's phone rings, and associates the unique phone number with Burt's advertisement. In one embodiment, the telephone number that is automatically generated may be a toll free number. In one embodiment, the telephone number may be a local number with the same area code as Burt's actual telephone number. In one embodiment, the telephone number may be an easily recognizable 800 number, modified by a unique extension mapped to Burt's business telephone number. For example, in one embodiment, a number could be the number "1-800-YEL-PAGES-1234." The 1234 portion of the 800 number is the unique extension that is mapped to Burt's telephone number so that when a searcher calls the number 1-800-YEL-PAGES-1234, the call can be automatically routed to Burt's telephone as will be described in more detail below.

In one embodiment, the advertisement creation and management module 46, automatically inserts the unique telephone number assigned to Burt directly into Burt's advertisement. Alternatively, click to call logic 58 may be invoked in order to generate a button, or a clickable telephone number, which is automatically inserted into Burt's advertisement, so that when the button or telephone number is selected or clicked by a user operating a client 10, a telephone call is automatically initiated to Burt's telephone number.

In one embodiment, the advertisement creation and management module 46 also includes scheduling logic 59 that allows Burt to specify a schedule. The advertiser 16 can select a schedule which can be used to automatically turn on and turn off advertisement delivery or call routing during a specified period of time. The schedule can continue running (e.g., on a recurring basis); and the advertisement delivery and call handling can be automatically and continuously managed according to the pre-set schedule. In one embodiment, when the advertiser creates an advertisement, the system, on behalf of the advertiser, can set a default schedule. This default schedule, can control when the advertisements are delivered or calls are connected to the advertiser. In one embodiment, a default schedule is based on the categories or service area that the advertiser has selected, or based on a calculation/algorithm that determines an optimum schedule for call to be delivered to the advertiser. In one embodiment, the advertisers 16 can manage when calls generated from advertising are received (e.g., by modifying the default schedule or creating a separate schedule).

In one embodiment, the scheduling logic 59 permits Burt to set the hours of the schedule. For example, Burt can select to receive calls generated from advertisements Monday through Friday, from 8 AM to 8 PM. Based on such a schedule of Burt, the system can optimize advertising effort to generate calls in the scheduled hours of Burt. For example, the system can limit the presentation of the advertisements outside the scheduled hours during which Burt is to receive calls. For example, the system can prioritize different advertisements based on the scheduled hours of the corresponding advertisers, in additional to other considerations, such as the pay per call price bids of the advertisers, a rank of relevancy to the advertising context, etc.

In one embodiment, the scheduling logic 59 permits Burt to set the hours of operation of the business. For example, based on the business hours of Burt, the system can select to have advertisements for Burt turned on (e.g., for presentation or delivery to users) Monday through Friday, from 8 AM to 5 PM, or from 7 AM to 4 PM if a typical delay between a presentation of the advertisement to a call generated from the advertisement is one hour. For example, average delays may be determined for individual advertisements, or a group of advertisements in a category, for a media channel of advertisement, etc. In one embodiment, based on the hours of operation, hours at which calls are routed to Burt, and hours are which advertisements are delivered to users can be established. In one embodiment, the scheduling logic 59 allows Burt to set callable hours. The callable hours that Burt sets may or may not be the same as the hours of operation of the business, but Burt may decide to have different callable hours. In the callable hours Burt wishes to receive calls generated from the advertisement; and thus, the callable hours indicate that Burt does not want to receive calls from the advertisement in hours outside the callable hours. Therefore, the publication of the advertisements can be limited to the callable hours to optimize the advertising effort, or prioritized further in view of callable hours. Further, in one embodiment, the schedule may further specify the preferred destination of the calls generated from the advertisement. For example, Burt may specify that during callable hours 9:00 AM -5:00 PM, the calls are scheduled for connection to the work phone of Burt; during callable hours 5:01 PM-9:00 PM, the calls are scheduled for connection to the cell phone of Burt; during callable hours 9:01 PM to 12:00 AM, the calls are scheduled for connection to the voicemail of Burt; and during 12:01 AM-9:00 AM, the calls are scheduled for connection to a VoIP phone voicemail (or an exchange), etc.

The scheduling logic 59 can be accessed through multiple user interfaces. In one example, the scheduling logic 59 is accessed by an advertiser via a web browser. In another example, the scheduling logic 59 is accessed by an advertiser via a portable computing device, such as a cell phone, a portable data assistant, etc. The portable device can be configured to communicate utilizing SMS messages, MMS messages, etc. In another example, the scheduling logic 59 is accessed by an advertiser via a telephonic device from which an advertiser 16 can utilize DTMF tones or voice commands to input data via an interactive voice response (IVR) system. In another example, the scheduling logic 59 is accessed by an advertiser via a live operator who receives scheduling instructions from the advertiser.

The module 46 also includes on/off logic 60 that allows Burt to selectively turn on or turn off an advertisement or a group of advertisements. In one embodiment, the selections made in the scheduling of advertisement can be overridden by the advertiser's new selections.

When an advertisement is turned off or flagged as inactive, it is considered withdrawn from an advertisement campaign, and is therefore not made published e.g. through the search engine 19. In one embodiment, the on/off logic 60 further permits advertisers 16 to select a period of time at which an advertisement or a group of advertisements are to be turned off until the advertiser changes the status of the advertisement or group of advertisements, e.g. turns on the advertisements. In another embodiment, the on/off logic 60 permits advertisers 16 to select a period of time at which an advertisement or a group of advertisements are to be turned off until the next scheduled activation. In yet another embodiment, the on/off logic 60 permits advertisers 16 to select a period of time at which an advertisement or a group of advertisements are to be turned off for a specific number of days, hours, minutes, or a combination thereof.

Alternatively, only advertisements that are turned on, or have a status of "active" are published in accordance with the techniques disclosed herein.

In one embodiment, the on/off logic 60 further permits advertisers 16 to select a period of time at which an advertisement or a group of advertisements are to be turned on until the advertiser changes the status of the advertisement or group of advertisements, e.g. turns off the advertisements. In another embodiment, the on/off logic 60 permits advertisers 16 to select a period of time at which an advertisement or a group of advertisements are to be turned on until the next scheduled deactivation, e.g. turn off of the advertisement. In yet another embodiment, the on/off logic 60 permits advertisers 16 to select a period of time at which an advertisement or a group of advertisements are to be turned on for a specific number of days, hours, minutes, or a combination thereof.

In one embodiment, the on/off logic 60 can be accessed through multiple user interfaces. In one example, the on/off logic 60 is accessed by an advertiser via a web browser. In another example, the on/off logic 60 is accessed by an advertiser via a portable computing device, such as a cell phone, a portable data assistant, etc. The portable device can be configured to communicate utilizing SMS messages, MMS messages, etc. In another example, the on/off logic 60 is accessed by an advertiser via a telephonic device from which an advertiser 16 can utilize DTMF tones or voice commands to input data. In another example, the on/off logic 60 is accessed by an advertiser via a live operator who receives scheduling instructions from the advertiser.

The module 46 includes smart connect logic 62 that allows automatic routing of calls to various telephone numbers. For example, Burt may include a primary telephone number, and one or more secondary telephone numbers to be associated with his advertisement. Thus, in one embodiment, the smart connect logic 62 first routes the call to Burt's primary telephone number, and if no connection is achieved, then cyclically through Burt's list of secondary telephone numbers, until a connection is achieved.

The module 46 also includes arrange a call logic 64 that allows a searcher to input a time at which the searcher wishes to speak to Burt. The system then contacts Burt in order to arrange the call with the searcher. Burt may be contacted in a variety of ways, for example by sending a facsimile to Burt, by sending an email to Burt, by telephoning Burt, etc. to alert him of the arranged telephone call. In alternative embodiments, additional, less, or different logic may be included in the advertisement creation and management module 46.

The payment specification module 48, allows Burt to select a particular model and various parameters associated with billing. The module 48 includes flat fee logic 66 that presents an option to Burt through the user interface module 44, which if selected can cause Burt to be billed on a flat fee basis for each telephone call received within a particular category, or subcategory. The module 48 also includes bid for placement logic 68, which, through the user interface module 44, presents an option to Burt to choose to be billed on a bid-for-placement basis, as described above. The logic 68 supports proxy bids, and maximum/minimum bids.

The module 48 also includes spending level logic 70 that allows Burt to specify daily/weekly/monthly spending levels. The specified spending level essentially defines a budget per time period such that if the budget is exceeded within a particular time period, then Burt's advertisement can be automatically flagged as inactive or turned off, for the remainder of the time period. Burt is notified of this activity by the system and Burt is given the option of reactivating his advertisement by adding additional funds to his account.

In one embodiment, the billing module 40 includes logic to automatically waive charges for leads (calls) from searchers/customers who have called Burt recently. For example, if a customer calls on one day, and then dials the same number for a follow-up call a day later, the system automatically waives the charge for the second call since this lead has already been paid for. Thus, the advertiser (Burt) does not have to be concerned about a customer using the advertised telephone number more than once and causing multiple charges. In one embodiment, the system disclosed herein may be configured to waive the charges on leads from customers who have already called a particular advertiser within a specified number of days. In alternative embodiments, additional, less, or different logic may be included.

Figure 6:
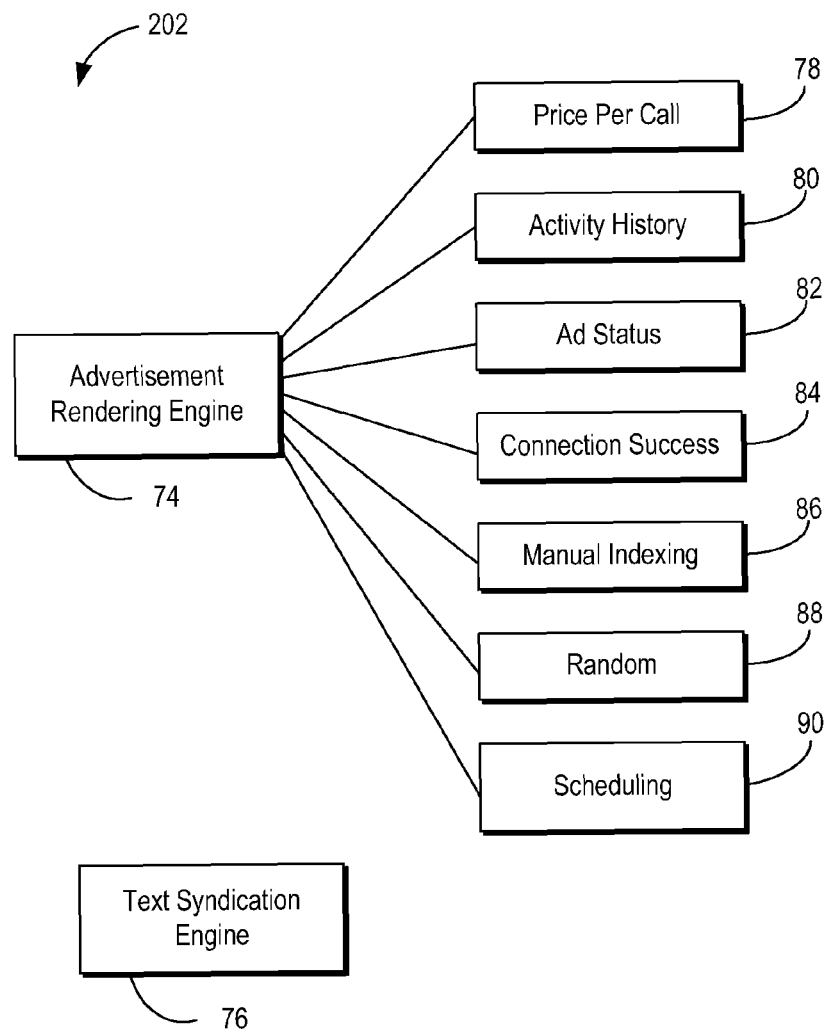
FIG. 6 illustrates the Advertisement Publication Module of the system.

Referring now to FIG. 6 of the drawings, the components of the advertisement publication module 36, are shown in greater detail. As will be seen, the module 36 includes an advertisement rendering engine 74, and an advertisement syndication engine 76. The purpose of the advertisement rendering engine 74 is to automatically render Burt's advertisement on a particular channel. In some embodiments, the advertisement rendering engine 74 causes a campaign management interface 113 (see FIG. 8B of the drawings) to be displayed to an advertiser. The interface 113 allows the advertiser to choose a channel, e.g., SBC, QwestDex, Ingenio, and a category in which the advertisement is to be provisioned/published. The interface 113 allows the advertiser to specify the maximum bid amount that the advertiser is willing to pay to provision the advertisement using the selected channel and category. FIG. 9 of the drawings shows an example of a web page 112 within which includes an advertisement rendered/provisioned in accordance with the techniques described herein. In one embodiment, this publication channel may be a web-based publication channel which is operated by an operator of the system as disclosed herein.

Alternatively, the syndication engine 76 may be used to syndicate Burt's advertisement to a number of third parties that host publication channels selected by Burt. Thus, in one embodiment, the syndication engine 76 may cause Burt's advertisement to be syndicated to third party search engines, Internet yellow pages, online directories, and other media.

As will be seen in FIG. 6 of the drawings, the advertisement rendering engine 74 includes price per call logic 78, activity history logic 80, call status logic 82, connection success logic 84, manual indexing logic 86, and random logic 88. Each of the logic components 78-88 controls a parameter that forms a basis of how Burt's advertisement is ultimately rendered. The price per call logic 78 causes Burt's advertisement to be published on a price per call basis. Thus, for example, if Burt is willing only to pay a low amount for each call, then his advertisement can be placed or ranked low down within a search result page or category of advertisers. Alternatively, if Burt is willing to pay a high price per call, then his advertisement can be placed higher up in the search result page or category of advertisers. The table below shows how the price per call logic 78 would rank or place advertisers within a channel based on a bid amount per call that an advertiser is willing to pay:

| Placement | Advertiser | (Bid Amount per call) |
|---|---|---|
| 1 | 800-349-2398 | ($3.88) |
| 2 | 866-324-3242 | ($3.22) |
| 3 | 800-323-5321 | ($2.01) |

The activity history logic 80 analyzes the number of calls Burt received in a give time period, for example, the last day/week/month, and can rank Burt's advertisement within a display page based on the activity history. The call status logic 82, examines the status (active or inactive) of Burt's advertisement, and selectively publishes Burt's advertisement based on the status. The connection success logic 84 measures a connection success rate for calls to the telephone number assigned to Burt's advertisement and ranks Burt's advertisement within a display page based on the connection success rate. For example, if Burt's telephone number enjoys a low connection success rate then the logic 84 can cause Burt's advertisement to be ranked lowly within a publication page. The manual indexing logic 86 allows an operator to manually index or rank Burt's advertisement within a publication page. The random logic 88 allows Burt's advertisement to be randomly ranked or placed within a result page. In one embodiment, the ranking of Burt's advertisement within a display page may be based on any combination of the parameters controlled by the logic components 78-88, which may be dictated by a third party who employs the system. In alternative embodiments, additional, less, or different logic may be included in the advertisement rendering engine 74.

In one embodiment, a scheduling logic 90 can be further included in the advertisement rendering engine 74. The scheduling logic 90 can be configured with logic to determine whether an advertisement is active for publication and/or the priority of the advertisement. For example, depending on the status of the advertisement, the scheduling logic 90 may or may not present the advertisement. As previously discussed, the advertiser 16 can set schedules which can be used to manage the publication or advertisement delivery, and further, can set advertisements as active or inactive (e.g., turn advertisements on or turn advertisements off).

For example, if an advertisement is set to be inactive, or turned off, or currently in non-callable hours, the scheduling logic 90 can provide an indication that the advertisement is not to be published at that time, or has a low priority. Otherwise, if the advertisement is set to be active, or turned on, or currently in callable hours, the scheduling logic 90 can provide an indication that the advertisement can be published or delivered at that time, or has a high priority.

Referring now to FIG. 7 of the drawings, the components within the call handling module 38 include a call routing engine 92, and a call monitoring engine 94. As will be seen, the call routing engine 92 includes redirect logic 96 to cause redirection of a telephone call to the number assigned to Burt's advertisement. The redirection is to a telephone number specified by Burt during creation of the advertisement using the advertisement creation and management module 46. The call routing engine 92 also includes VoIP logic 98 to route a telephone call to or from a client to a telephone number specified by Burt in the advertisement using VoIP technology.

Figure 10:
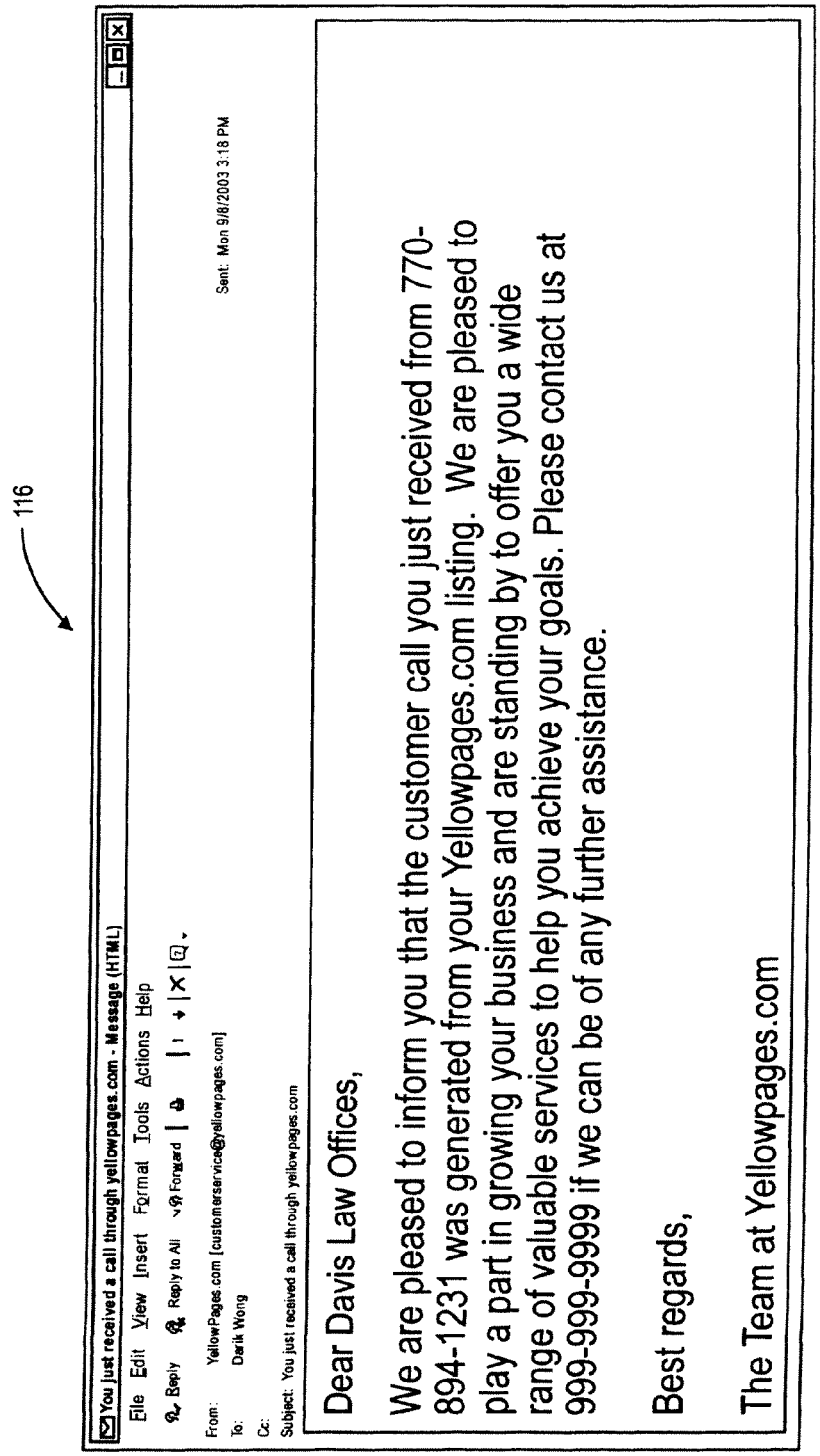
FIG. 10 illustrates an example of an email alert that is sent to an advertiser, when a call is generated.

The call routing engine 92 may also include prompt logic 99 that causes a prompt to be played to a caller before routing of a telephone call to Burt's telephone number. In one embodiment, the prompt logic 99 plays an information prompt to the caller to inform the caller of Burt's actual telephone number. Thus, the caller may, in future, call Burt directly using Burt's actual telephone number instead of the telephone number assigned to Burt by the system. In such cases, Burt will not be billed by the system for telephone calls to his actual telephone number. In one embodiment, the prompt logic 99 may also cause an information prompt to be played to Burt to inform Burt of the source of the telephone call. In some cases, the prompt logic 99 may cause an email or facsimile alert to be automatically generated and sent to an advertiser, in order to inform the advertiser of the telephone number of the caller. An example of such an email is shown in FIG. 10 of the drawings and is marked as reference numeral 116. In alternative embodiments, additional, less, or different logic may be included in the call routing engine 92.

The call monitoring engine 94 includes call number logic 100 to track the number of calls generated in response to Burt's advertisement. The call monitoring engine 94 also includes Automatic Number Identification (ANI) logic 102 to identify the number of unique numbers of callers that call Burt, automatically. The call monitoring engine also includes call length logic 104 that monitors the length of each call to Burt. Connection status logic 108 monitors whether a call is successful, whether an engaged or busy tone is encountered, or whether Burt simply did not answer his telephone. Based on information supplied by logic components 100-106, a report is compiled and may be viewed by Burt. In one embodiment, the report includes a number of calls, the number of calls from unique telephone numbers, the telephone numbers of the callers, the length of each call, and the number of calls that were successful, for which an engaged tone was returned, or that went unanswered. The report may be used by Burt in order to monitor the effectiveness of an advertisement campaign, and to optimize the campaign. In alternative embodiments, additional, less, or different logic may be included in the call monitoring engine 94.

In one embodiment, the advertising publication module may publish the advertisement on a telephone-based advertising service. For example, the advertisement can be delivered to a customer through audio as part of a voice portal or telephone-based directory such as a 411 telephone directory.

Figure 11:
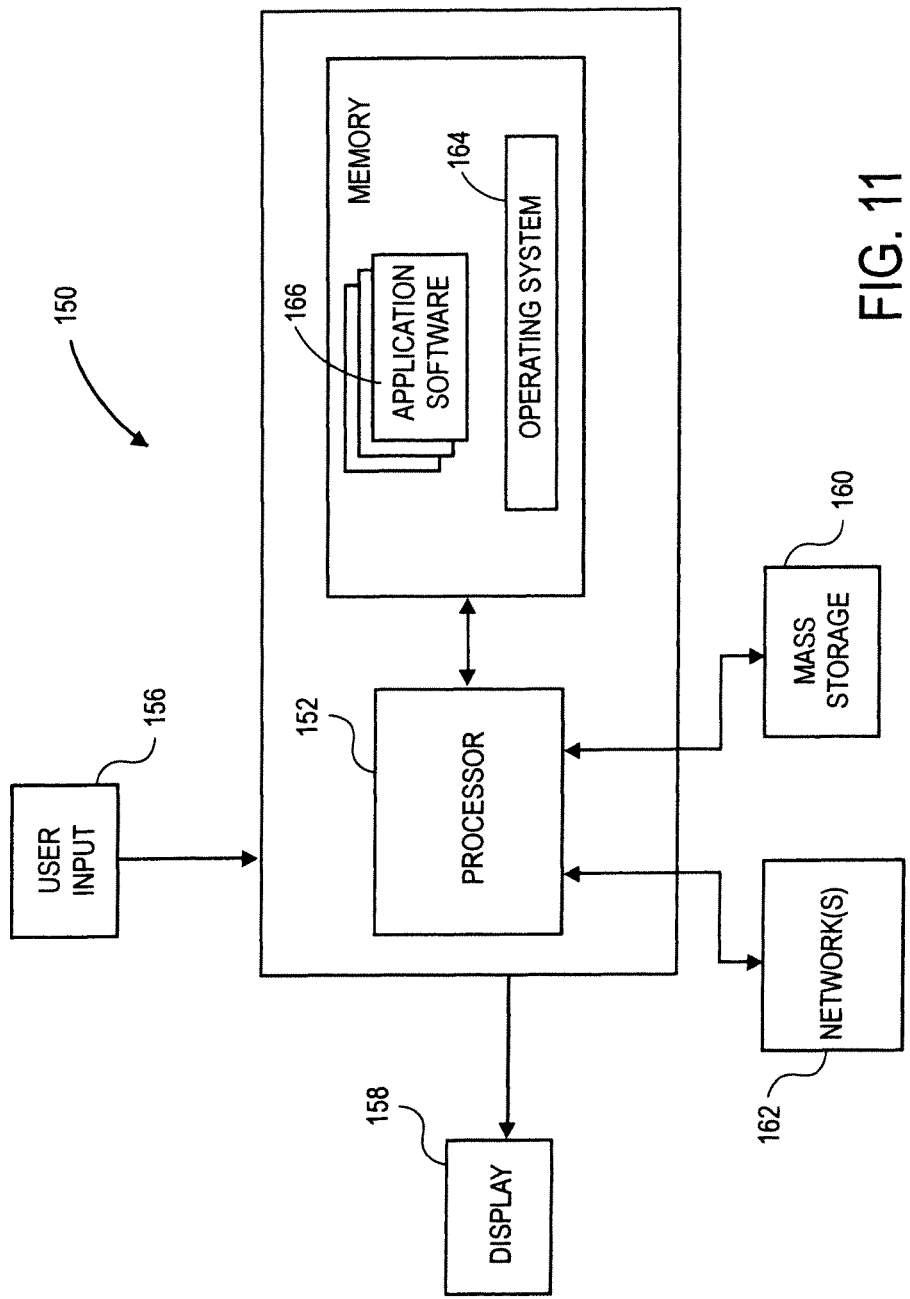
FIG. 11 illustrates a high level hardware block diagram of a system that may be used to implement the system.

Referring to FIG. 11 of the drawings, reference numeral 150 generally indicates hardware that may be used to implement the above-described system. The hardware 150 typically includes at least one processor 152 coupled to a memory 154. The processor 152 may represent one or more processors (e.g., microprocessors), and the memory 154 may represent random access memory (RAM) devices comprising a main storage of the hardware 150, as well as any supplemental levels of memory e.g., cache memories, non-volatile or backup memories (e.g. programmable or flash memories), read-only memories, etc. In addition, the memory 154 may be considered to include memory storage physically located elsewhere in the hardware 150, e.g. any cache memory in the processor 152, as well as any storage capacity used as a virtual memory, e.g., as stored on a mass storage device 160.

The hardware 150 also typically receives a number of inputs and outputs for communicating information externally. For interface with a user or operator, the hardware 150 may include one or more user input devices 156 (e.g., a keyboard, a mouse, etc.) and a display 158 (e.g., a Cathode Ray Tube (CRT) monitor, a Liquid Crystal Display (LCD) panel).

For additional storage, the hardware 150 may also include one or more mass storage devices 160, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 150 may include an interface with one or more networks 162 (e.g., a local area network (LAN), a wide area network (WAN), a wireless network, and/or the Internet among others) to permit the communication of information with other computers coupled to the networks. It should be appreciated that the hardware 150 typically includes suitable analog and/or digital interfaces between the processor 152 and each of the components 154, 156, 158 and 162 as is well known in the art.

The hardware 150 operates under the control of an operating system 164, and executes various computer software applications 166, components, programs, objects, modules, etc. (e.g. a program or module which performs operations described above. Moreover, various applications, components, programs, objects, etc. may also execute on one or more processors in another computer coupled to the hardware 150 via a network 152, e.g. in a distributed computing environment, whereby the processing required to implement the functions of a computer program may be allocated to multiple computers over a network.

As discussed above, the syndicate engine 76 is used to syndicate Burt's advertisement to a number of third parties. Additional examples of third parties include companies such as Yahoo!®, MSN®, AOL®, and other similar demand partners. Often times, these demand partners (also referred to herein as syndication partners) receive a percentage of the advertising revenue generated via the pay-per-call method and system described, herein. Thus, as in the example of the table above, the advertiser of placement 1 pays $3.88 per call received to phone number 800-349-2398. Now suppose the call to the advertiser of placement 1, resulted from an advertisement presented on a demand partner's website. The demand partner would be entitled to a percentage of that $3.88. The present method and system offers multiple embodiments for tracking, monitoring, and determining demand partner compensation.

Figure 12:
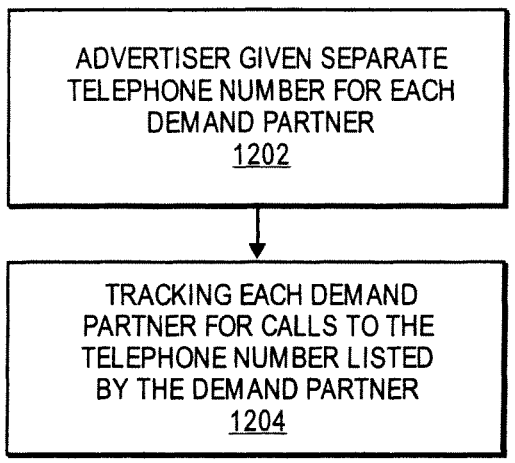
FIGS. 12-18 describe processes in accordance with embodiments of the invention to track/credit demand partners.

In one embodiment, described in the flow diagram of FIG. 12, in process 1202 an advertiser (also referred to herein as a merchant or listing) is given a separate telephone number for each separate demand partner that is posting the merchant's advertisement using. As described herein, in multiple embodiments, telephonic references, including telephone numbers and telephone extensions corresponding to a base telephone number, are assigned using the telephone number auto generation logic 56.

In one embodiment, the alias phone number is mapped to the advertiser's actual phone number, and calls made to the alias are monitored in order to track the respective demand partners. Therefore, in process 1204 billing module 40 tracks and/or credits demand partners a percentage of the revenue charged to the advertiser (or collected from the advertiser) for calls placed to the advertiser's alias telephone number corresponding to the respective demand partner.

Figure 13:
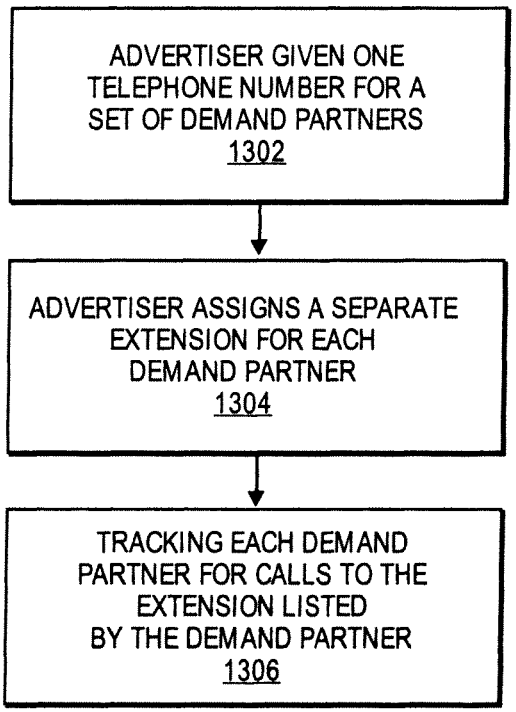

In another embodiment, described in the flow diagram of FIG. 13, in process 1302 an advertiser receives a single/base (the same) telephone number for a set of the demand partners. In process 1304, a separate extension is assigned to the advertiser for each of the separate demand partners. More specifically, the separate demand partners list the same telephone number for the advertiser, but also include an extension unique to the respective demand partner. For example, a listing could have the number "(800) new-cars" for the set of demand partners, but each demand partner posting the common telephone number for the advertiser would also provide a separate extension corresponding to the respective demand partner (e.g., ext. 102 corresponding to the XYZ syndication partner, ext. 104 corresponding to the ABC syndication partner, etc.) In process 1306, billing module 40 tracks and/or credits a demand partner a percentage of the revenue charged to the advertiser (or collected from the advertiser), for calls placed to the advertiser via the telephone extension corresponding to the respective demand partner.

Figure 14:
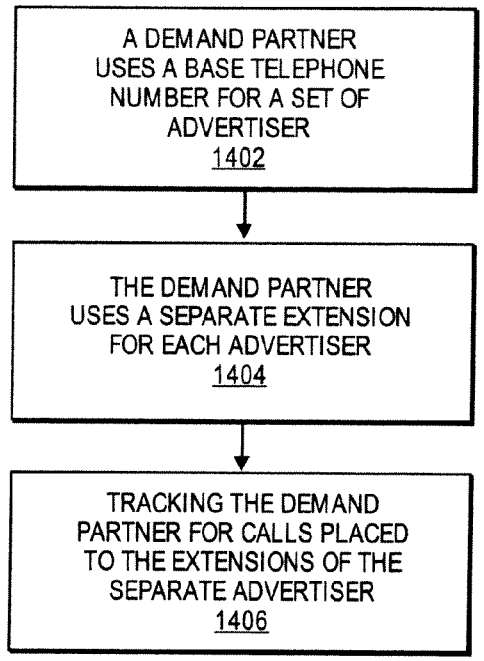

In an alternative embodiment, described in the flow diagram of FIG. 14, in process 1402 a demand partner uses a base telephone (i.e., a single) number for a set of advertisers. In process 1404, the demand partner provides a separate extension to each of the advertisers using the same base number. For example, the demand partner could use the telephone number (800) Call XYZ for a set of advertisers, and provide the extension 102 for Joe's plumbing, and extension 104 for Carl's plumbing, etc. In process 1406, billing module 40 tracks and/or credits a demand partner a percentage of the revenue charged to the advertiser (or collected from the advertiser), for calls placed to the advertiser via the base telephone number corresponding to the respective demand partner and the unique telephone extension assigned to the advertiser at the respective demand partner.

Figure 15:
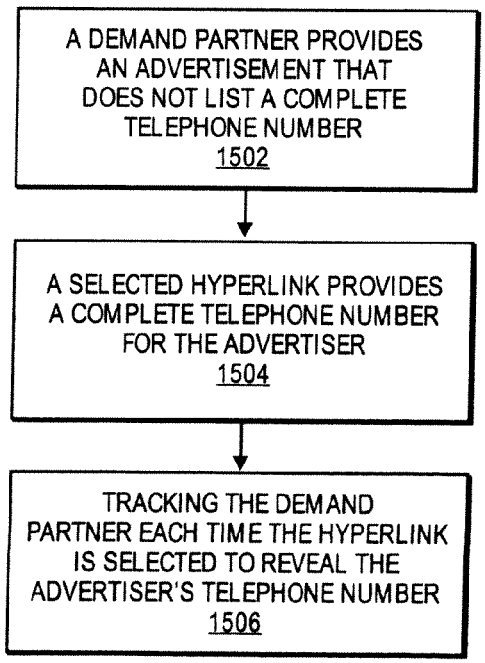

According to another embodiment, a click-to-reveal method is proposed, as described in co-pending U.S. Patent Application No. 60/552,124, entitled "A Method and Apparatus to Provide Pay-Per-Call Performance Based Advertising and Billing" filed on Mar. 10, 2004, herein incorporated by reference. As described in the flow diagram of FIG. 15, in process 1502 a user is presented with an advertisement via a demand partner's website. The advertisement does not show the advertiser's complete phone number, but instead contains a hyperlink to reveal the advertiser's phone number, or the remaining portion of the telephone number. In process 1504, the Advertisement rendering engine 74 monitors the number of click-throughs to reveal the advertiser's number. In one embodiment, it is assumed that each click-through from a demand partner results in a call to the respective advertiser. As a result, in process 1506 billing module 40 tracks and/or calculates an amount to credit a demand partner based at least in part on a number of click-throughs to reveal an advertiser's telephone number.

Figure 16:
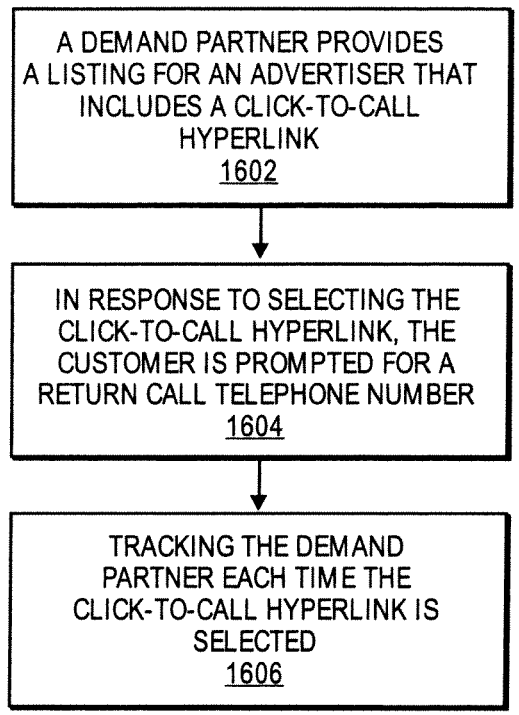

In yet another alternative embodiment, a demand partner is provided with a click to call format. In one embodiment, as described in the flow diagram of FIG. 16, in process 1602 in addition to listing a telephone number for an advertiser (or in place of listing a telephone number for the advertiser) a link is provided by the demand partner to initiate establishing a telephone connection between the viewer/customer and the advertiser in response to the viewer/customer activating/selecting the hyperlink provided. In one embodiment, in process 1604, in response to activating/selecting the hyperlink provided, the viewer/customer is prompted for their telephone number to establish the telephone connection with the advertiser. After the customer enters their telephone number, a telephone connection is established between the customer and the advertiser.

In yet another embodiment, if the viewer/customer has a VoIP communications device, VoIP logic 98 may connect the advertiser to the viewer/customer without the need for the customer/viewer to provide their telephone number. The VoIP communications device includes telephony devices attached to the user's computer, as well as mobile communication devices, such as PDA's and cellular phones.

In the embodiment employing a click to call (for PSTN and VoIP connections), in process 1604, a demand partner providing the click to call option would be tracked/credited (i.e., a percentage of the charge to the advertiser) each time a viewer/customer selects/activates a click to call icon for the respective advertiser.

Figure 17:
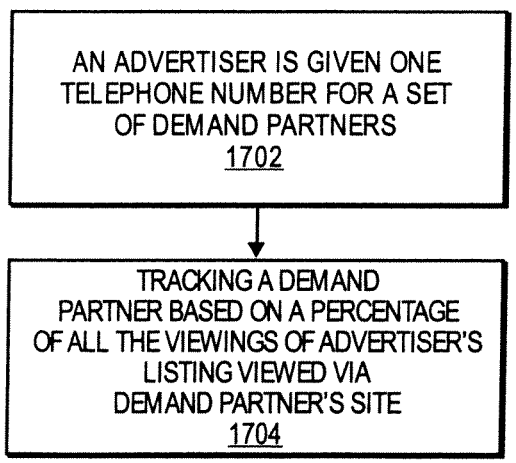

In another embodiment, described in the flow diagram of FIG. 17, in process 1702 an advertiser is given one telephone number for a set of demand partners. In process 1704, credits to the demand partners for calls placed to the advertiser's listed telephone number are prorated based on a number of page views for the advertiser's telephone number listing via the respective demand partners. For example, if 70% of the advertiser's page views are accessed via demand partner ABC, and 30% of the advertiser's page views are accessed via demand partner XYZ, the ABC demand partner would receive 70% and the demand partner XYZ would receive 30% of the credits payable to the demand partners for calls placed to the advertiser's listed telephone number.

Figure 18:
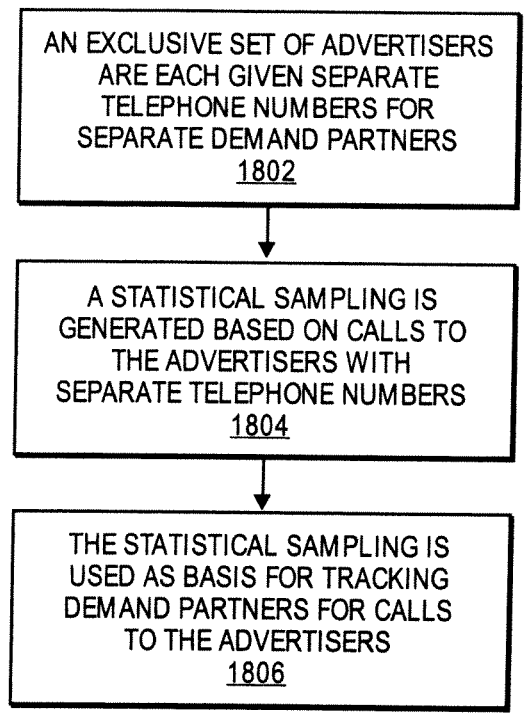

In another embodiment, described in the flow diagram of FIG. 18, in process 1802 at least a first set of advertisers are given unique telephonic reference for each demand partner. One or more advertisers are each given one telephonic reference for a set demand partners.

In process 1804, a statistical sampling of calls to advertisers with the unique telephonic reference is generated. In one embodiment, the statistical sampling represents a sampling of a percentage of calls to an advertiser (or set of advertisers) that originate from an advertisement listed by a first demand partner compared to calls that originate from the same (or similar) advertisement listed by other demand partners. In one embodiment, the samplings may be separated based on a category of advertisers (e.g., restaurants, automobiles, etc.).

In process 1806, the samplings are used as a basis for tracking/crediting the demand partners with a percentage of the charges to at least a set of the advertisers. Consider the example advertisers 1 and 2 are given each give unique telephone, and 70% of the calls to advertisers 1 and 2 are from telephonic references listed by partner ABC. Given the example, an assumption is made that 70% of the calls to the advertisers using a common number among the demand partners, are originated from advertisements listed by partner ABC.

Therefore, in one embodiment, based on the statistical sampling, partner ABC would be credited for 70% of the calls placed to the advertisers using a common number among the demand partners. In one embodiment, tracking/crediting the demand partners based on the statistical sampling could also be applied to the advertisers using unique numbers among the demand partners.

As described above, telephone-call tracking is used to determine the number of phone calls a particular party, or directory, has received. It can be useful for a variety of purposes. It is particularly useful in measuring the success of advertising. For instance, a telephone directory may offer advertising placements to its advertisers, such as plumbers. By tracking the number of phone calls a particular advertisement has received, the directory can demonstrate the value of its advertising to the advertiser.

Telephone-call tracking can be used to measure the effectiveness of a variety of advertising vehicles in addition to the physical yellow-pages phone book. Newspaper classifieds can utilize call tracking, as can television commercials that display phone numbers for customers to call. By counting the number of telephone calls such advertisements receive, the campaign's effectiveness can be measured. This is of benefit both to the advertiser and to the directory.

Telephone-call tracking can be also used as such in directories that are online, such as an online yellow pages. Similarly, it can be used to track the success of online search advertising, such as keyword advertising.

Telephone-call tracking is particularly useful in pay-for-performance advertising systems, as described in several embodiments above. In pay-for-performance systems, advertisers pay when an advertisement performs. For instance, an advertiser can pay $1 each time a potential customer clicks on an online-search advertisement. Similarly, in pay-per-call advertising systems, such as that covered in U.S. patent application Ser. No. 10/872,117, an advertiser's payments are linked to the number of calls that advertiser receives. In such a pay per call advertising system, call tracking is vital, since counting the number of calls received determines the amount that the advertiser must pay. In one embodiment, not only are the number of calls received counted but also the time of the call, since in one embodiment an advertiser may bid to pay a higher price per call in order to receive a more prominent placement for their advertisement.

Not only is it important to track the number of calls and precise time of calls, but the demand source at which the caller viewed the advertisement may also be tracked. Online directories can have many different external web sites through which they syndicate the same advertisers, and it is important to know from which web site the phone call originated so that, in some cases, the directory can compensate the external web site for having brought customer. U.S. Patent Application Ser. No. 60/560,926 outlines this case.

Tracking phone calls may include publishing a unique phone number that is different from the advertiser's standard phone number. When a caller views the advertisement, the unique phone number appears, and the caller dials it. The call coming in on the unique phone number is then rerouted, using the call tracker's telephony equipment, to the advertiser's standard phone number. In addition to rerouting the call, the call tracker also records that a call was made and the precise time of the call. In a pay-per-call advertising system, this information can be used to bill the advertiser for the call.

In cases where directories would also like to identify the demand source of the call, a single advertiser will have to be given multiple unique phone numbers, one for each demand source where that advertiser appears. For instance, the advertisement of a single plumber might be displayed in two different online directories and three different online search engines. In order to track which of these demand sources produced a call from a customer, the single plumber would have to be assigned five different unique telephone numbers. By monitoring which unique phone number was dialed, it can be determined which demand source deserves the credit for producing the call.

Figure 19:
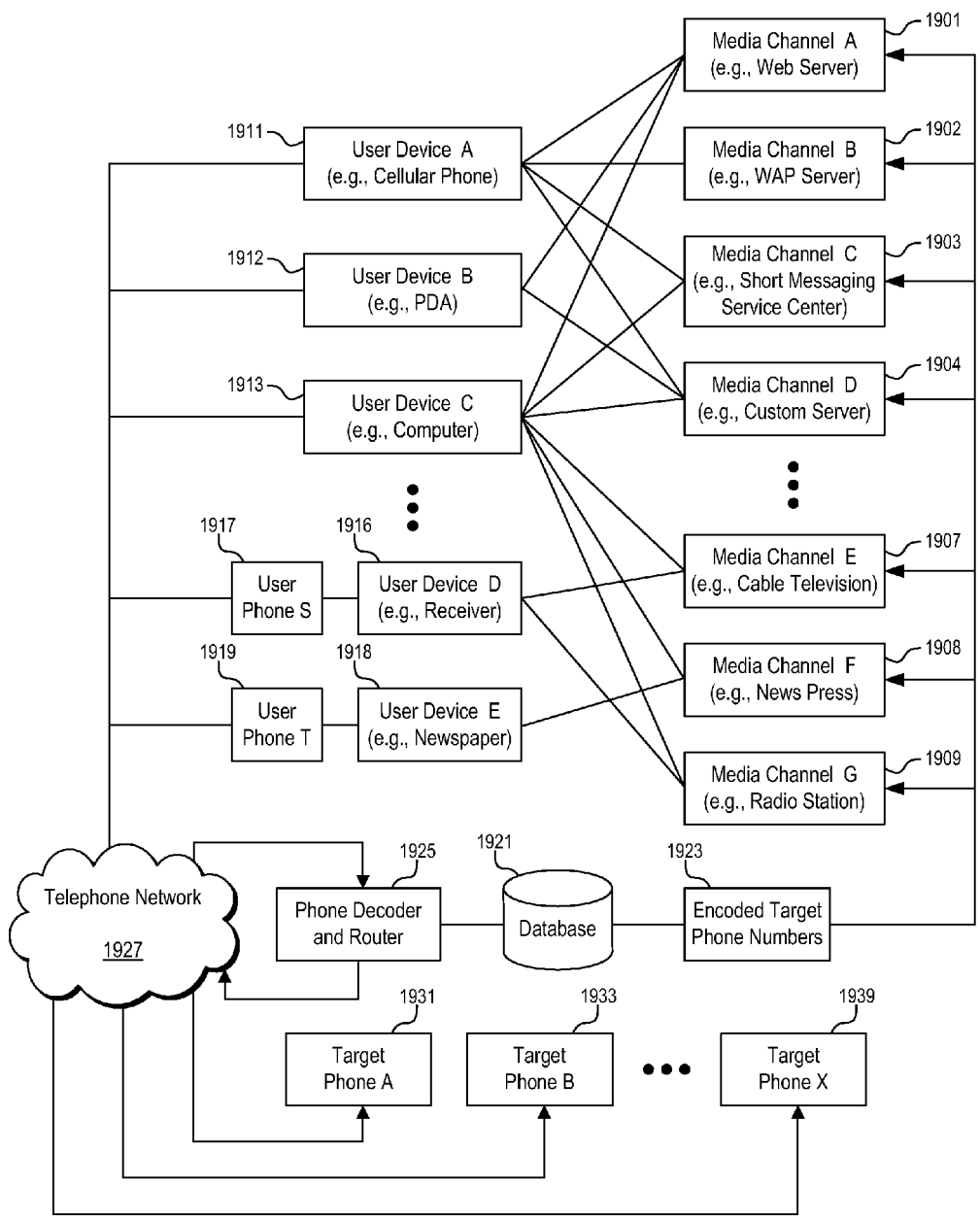
FIG. 19 illustrates a diagram of a system to make and track phone connections.

FIG. 19 shows a diagram of a system to make and track phone connections. In FIG. 19, a database (1921) may contain the phone numbers of target phone A (1931), target phone B (1933), . . . , target phone X (1939), etc. Typically, the target phones belong to the institutions, businesses, individuals, etc, which seek for publicity through various media channels, such as media channel A (1901) (e.g., web server), media channel B (1902) (e.g., WAP server), media channel C (1903) (e.g., short messaging service center), media channel D (1904) (e.g., custom server), media channel E (1907) (e.g., cable television), media channel E (1908) (e.g., news press), media channel G (1909) (e.g., radio station), etc.

In one embodiment, the phone numbers of the target phones are not directly publicized over the media channels. Instead, encoded target phone numbers (1923) are used. Using the encoded target phone numbers (1923), a user cannot reach target phones directly. The encoded target phone numbers (1923) allow the association of additional information with the target phone numbers, such as the media channels used, special promotions, etc.

The encoded target phone numbers are delivered with content information (e.g., web page, WAP page, short message, television programs, news articles, etc.) to user devices, such as user device A (1911) (e.g., cellular phone), user device B (1912) (e.g., personal digital assistant (PDA)), user device C (1913) (e.g., computer), user device D (1916) (e.g., receiver), user device E (1918) (e.g., newspaper).

In one embodiment, the user devices are mobile devices, such as PDA, cellular phone, etc. The user devices obtain content information, including advertisements, through wireless communication connections, such as cellular communication links, wireless access points for wireless local area network, etc.

In one embodiment, a user device (e.g., a cellular phone, a computer, a PDA) can receive content information from multiple types of media channels (e.g., a web server, a WAP server, a SMSC, etc.).

In one embodiment, a user device is capable to dial a phone call (e.g., automatically according to the encoded phone number embedded in the content information when a user selects the number). Alternatively, a user may manually dial a phone call using a separate phone, such as user phone S (1917) or user phone T (1919).

In one embodiment, dialing at least a portion of an encoded target phone number connects the phone call to a phone decoder and router (1925) first. According to the encoded target phone number dialed, the phone decoder and router (1925) determines the corresponding target phone number using the database (1921) and connects the phone call to the corresponding target phone (e.g., one of target phones 1931-1939) through the telephone network (1927).

Note the telephone network (1927) may be circuit switched, package switched, or partially circuit switched and partially package switched. For example, the telephone network may partially use the Internet to carry the phone call (e.g., through VoIP). For example, the connection between the user phone/device and the phone decoder and router (1925) may be carried using VoIP; and the connection between the phone decoder and router (1925) may be carried using a land-line based, circuit switched telephone network.

In one embodiment, the information associated with the encoded target phone number, such as the media channel used to provide the encoded target phone number to the users, is also decoded/retrieved using the database (1921). Thus, the information associated with the encoded target phone number can be tracked/stored.

In one embodiment, the phone decoder and router (1925) also determines the phone number of the user through Automatic Number Identification (ANI). ANI is a phone system feature that provides the billing number of the person making the phone call.

The information about the caller, target phone number, the media channel used for delivering the contact information to the user can be used to bill the caller and/or the target phone number, and provide credit/compensation for the corresponding media channel.

For example, the advertisements for target phone numbers can be paid for on a pay per call basis. Monitoring and tracking the calls can be used for billing the advertisers. Alternatively, the users may be seeking the contact information on a pay per call basis. Monitoring and tracking the calls can be used for billing the users.

In one embodiment, the additional information associated with the encoded target phone number is used to provide credit/compensation to the operators of the corresponding media channels that are responsible for leading the users to the phone calls to the target phones. The system can further track the time and duration of the phone calls and other information, such as conditional promotions, electronic coupons, etc.

The information about the media channels that are responsible for leading the users to the phone calls to the target phones can also be useful for the advertisers. The advertisers may wish to know which media channel is more effective in reaching users. For example, using the statistic information about the media channels which successfully bring in phone calls, the advertisers may fine tune advertisement strategies. Further, different media channels may charge differently for the advertisements; and the advertisers may bid differently on different media channels for their advertisements.

In one embodiment, an encoded target phone number has the same number of digits as a standard phone number (e.g., a typical telephone number assigned by a telephone company). Thus, dialing the encoded target phone number is as easy as dialing the target phone number; and dialing the target phone number reaches the phone decoder and router (1925). In such an arrangement, a large number of encoded phone numbers are generally required to differentiate the different target phones and different media channels.

In one embodiment, an encoded target phone number has more digits than a standard phone number. A first portion of the encoded target phone number has the same number of digits as a standard phone number to reach the phone decoder and router (1925) through the telephone network (1927); and a second portion of the encoded target phone number is to be decoded by the phone decoder and router (1925). For example, the Dual Tone Multi-Frequency (DTMF) decoder can be installed in the phone decoder and router (1925) to detect the second portion of the encoded target phone number dialed at the user phone. The detected phone number can then be used to recover the target phone number.

In one embodiment, a single telephone number is used to reach the phone decoder and router (1925) for different target phone numbers; and the portion of the encoded target phone number that is used to reach the phone decoder and router (1925) is not used in determining the information associated with the encoded target phone number.

Alternatively, multiple telephone numbers can be used to reach the phone decoder and router (1925); and the entire encoded target phone number can be used to determine the information associated with the encoded target phone number.

In one embodiment, the encoded target phone numbers can have different numbers of digits. The advertisers may be arranged to bid for shorter encoded target phone numbers.

In one embodiment, the encoded target phone numbers are assigned only when needed for use in a media channel.

In one embodiment, a look-up table approach is used to encode the information. For example, the database (1921) keeps track of the information about the media channel and the target phone number (and other information, if any) for the encoded target phone number so that the encoded target phone number can be used as a key to retrieve the corresponding information. Thus, it is not necessary to have a predetermined structure to encode the information about the media channels and the target phone number.

Alternatively, algorithms can be used to generate and encode target phone number and associated information. For example, a predetermined algorithm may be used to encode different information in the target phone number. For example, the target phone number may include a number of field separated by "*" or "#". Each of the field can be decoded separately (e.g., from a separate look up table or a mapping algorithm) to determine the target phone number, identity of the media channel, etc.

For example, a set of parameters can be mapped from a string of characters to a string of numerical digits as a part of the encoded target phone number; and the string of numbers can be mapped back into the string of characters at the phone decoder and router (1925). When such a mapping scheme is used, a look up table is not necessary. For example, an encoded target phone number may include a first portion that is the phone number of the phone decoder and router (1925), a second portion that is the target phone number appended with a number mapped from an identifier of the media channel. To prevent the user from dialing the target phone number directly, an encryption/scrambling scheme can be used to encode the second portion, which is decoded at the phone decoder and router (1925).

In one embodiment, the phone decoder and router (1925) determines the target phone number from the encoded target phone number dialed by the user and then dials the target phone number for the user and joins the phone calls so that the user can talk to the target phone.

In one embodiment, users dial the encoded target phone numbers manually. A user can dial the encoded target phone number regardless the user device used and the media channel used.

Alternatively, in one embodiment, user devices can automatically dial the encoded target phone numbers. For example, a cellular phone, a computer or a PDA can dial a phone number using a Dual Tone Multi-Frequency (DTMF) generator. In one embodiment, the encoded target phone numbers are presented in the content information in a format such that when the user selects the phone number the user device (e.g., a cellular phone or a computer) dials the encoded target phone number for the user. The user selection may be in the form of an keyboard/keypad input, a touch pad input, a track ball input, a mouse input, a voice command, etc.

In one embodiment, the user device initiates the phone call through a VoIP system when the user selects the encoded target phone number.

In one embodiment, the user device dials the phone number for the user without the user manually pressing the sequence of the encoded target phone numbers. This greatly simplifies the process of make the phone call. Since a user device can dial a long sequence of number easily, a large number of digits can be used to encode the information without presenting any difficulties for the users.

In one embodiment, the encoded target phone numbers are formatted so that the user device dials a first portion of the encoded target phone numbers to access the phone decoder and router (1925), pauses for a short period of time for the phone decoder and router (1925) to prepare for receiving the second portion of the encoded target phone numbers, and then dials the second portion of the encoded target phone numbers. Thus, the user device provides a user-friendly way of dialing the encoded target phone numbers; and, making the phone call can be as easy as making a "click" to access a web page.

In FIG. 19, the user device initiates the phone call. Alternatively, a phone router may be used to initiate phone calls both to the user device (or a separate user phone) and the target phone and then join the phone calls to connect the user to the target phone. For example, when the user selects the encoded target phone number, the selection of the target phone number is transmitted to the phone router with the user phone number.

The user phone number can be automatically determined through ANI, or through a user preference setting, or through an entry submitted with the selection of the encoded target phone number.

In one embodiment, the selection of the encoded target phone number is transmitted to the corresponding media channel, which forwards the request for making the phone call to a server (e.g., a web server) connected to the phone router. Alternatively, the content information can be formatted so that the selection is sent directly to the server that is connected to the phone router.

When the router starts the phone calls, the encoded target phone number can also include alphabetic characters (and/or other characters). The server and/or the phone router can decode the encoded target phone number to recover/retrieve the target phone number and other associated information, such as the identity of the media channel that is creditable for providing the encoded target phone number to user.

Scheduling

As previously mentioned, the systems and methods described herein further permit advertisers to activate and deactivate advertisements via direct commands of activation or deactivations, scheduling times or periods of activation or deactivation, or a combination thereof. In one embodiment, an advertiser can set callable hours at which the advertiser is to receive calls from customers. The advertisement delivery and call routing can then be optimized according to the callable hours such that the advertiser receives calls during the callable hours set by the advertiser.

In another embodiment, activation or deactivation of an advertisement can be utilized by an advertiser to pause delivery of advertisements to customer. In yet another embodiment, activation or deactivation of an advertisement can be utilized by an advertiser to pause call customer call rerouting to the advertiser during one or more predetermined periods.

Figure 20:
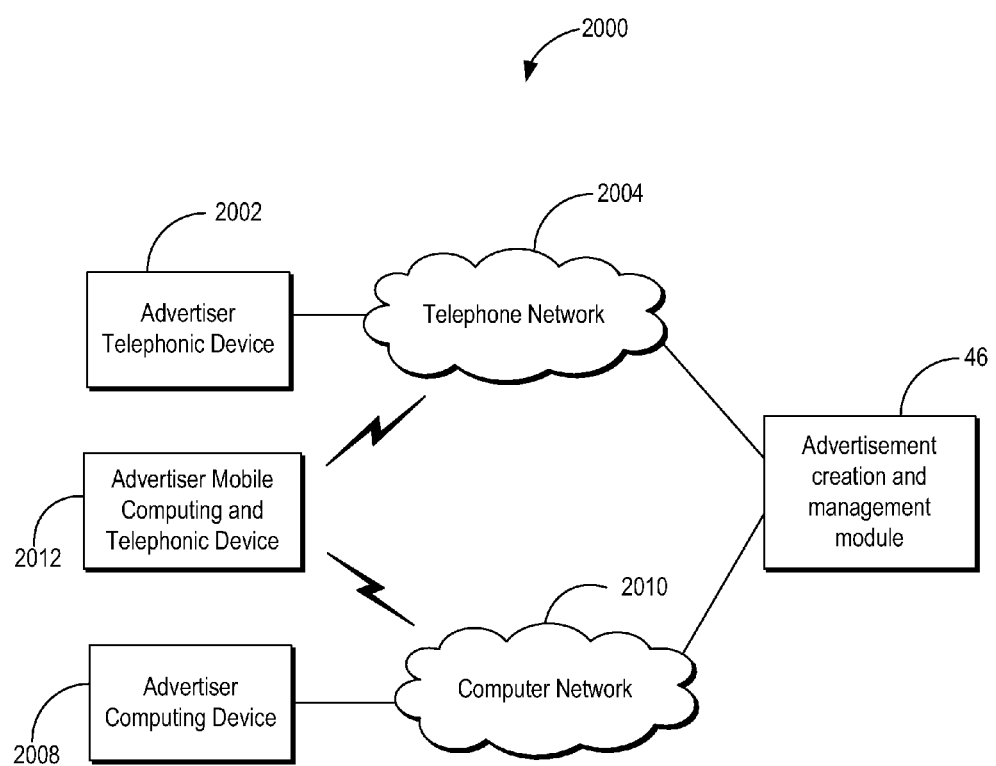
FIG. 20 illustrates a system for scheduling advertisements.

FIG. 20 illustrates a system for scheduling advertisements. The system 2000 includes the advertisement creation and management module 46. The advertisement creation and management module 46 can be configured with logic to receive instructions from an advertiser in order to schedule active and inactive status of advertisements. In addition, the advertisement creation and management module 46 permits advertisers to set schedules for setting active or inactive status of advertisements upon creation of the advertisement or when editing an advertisement.

In one embodiment, when an advertiser creates or requests creation of an advertisement through the creation and management module 46, the advertisement creation and management module 46 can prompt the advertiser to input scheduling data related to callable hours at which the advertiser is scheduled to receive calls from customers. In one example, the advertisement creation and management module 46 can be configured with logic to permit an advertiser 16 to establish a weekly schedule that reflects the hours of operation or the hours at which the advertiser wishes to be contacted by users. The schedule can be, for example, a Monday through Friday, 7:00 A.M. to 5:00 P.M. schedule.

Additionally, upon creation of an advertisement, the advertisement creation and management module 46 can also permit an advertiser to turn off or deactivate the delivery of an advertisement, or temporarily turn off a callable period until the next callable period. For example, the advertiser may indicate that the remaining portion of the business hour for today is not callable, until the advertiser change the status or until the scheduled callable hours tomorrow. In one example, upon creation of an advertisement the default delivery status of the advertisement can be set to active. Furthermore, an advertiser may decide to, upon creation of the advertisement, set the advertisement to be inactive, such that the advertisement is not immediately delivered to customers upon creation. In another example, upon creation of the advertisement, the advertiser can activate the advertisement in order to allow the advertisement to be delivered to customers.

The advertisement creation and management module 46 can interact with the user interface module 44 in order to provide user interaction through the telephone network 204, or through the computer network 210.

Furthermore, advertisers can interact with the advertisement creation and management module 46 to create or edit advertisements. Therefore, advertisements that have been already created can later be edited and managed to establish a new status of advertisement delivery, callable hours, or hours of operation. As such, an advertiser can interact with the advertisement creation and management module 46 through an advertiser telephonic device 2002. The advertiser can utilize the advertiser telephonic device 2002 in order to transmit and receive communications through the telephone network 2004 to activate, deactivate or set a schedule for a specific advertisement or a group of advertisements. In one embodiment, the advertiser can also utilize the advertiser telephonic device 2002 to make a telephone call and communicate with the advertisement creation and management module 46 through a DTMF tone system that recognizes commands that are associated with DTMF tone. As an example, the user interface module 44 can be equipped with logic to parse and interpret DTMF tones such that the commands received from the advertiser, and the messages sent back to the advertiser can be easily communicated to the advertisement creation and management module 46.

In another embodiment, the advertiser telephonic device 2002 can be utilized by the advertiser to communicate with an automated voice recognition system that also interacts with the advertisement creation and management module 46 in order to set the status of an advertisement.

In yet another embodiment, the advertiser telephonic device 2002 can be utilized by the advertiser 16 to communicate with a live operator through the telephonic network 2004 in order to provide commands to set the schedule, or activate, or deactivate the advertisement.

In addition, the advertiser can further communicate with the telephone network 2010 through a mobile device, such as advertiser mobile computing and telephonic device 2012. In addition, the advertiser can also communicate with the computer network 2010 through the advertiser mobile computer and telephonic device 2012 in order to provide instructions to the advertisement creation and management module 46. The advertiser mobile computing and telephonic device 2012 can be configured to communicate wirelessly with the telephonic network 2004 and with the computer network 2010. As such, the advertiser mobile computing device can be configured to communicate, for example, with cellular networks when the telephone network 2004 is a cellular communications network.

In another embodiment, the advertiser mobile computing and telephonic device 2012 can communicate with a computer network 210 such as the Internet using wireless communication methods of packet-switched communication such as the Internet. In one example, advertiser mobile computing and telephonic device can be a smart phone, a BlackBerry device, a personal data assistant or any other wireless device that can permit a user to interact wirelessly with a telephonic network 2004 or with a computer network 2010 in order to communicate with an advertisement creation and management module 46 for management of advertisements. In addition, the advertiser mobile computing and telephonic device 2012 can be programmed with web browsers or other application interfaces that can be stored and executed at the advertiser mobile computing and telephonic device 2012 in order to communicate with the computer network 2010 and with the advertisement creation and management module 46. Examples of web browser applications are: Internet Explorer, Netscape, Opera, FireFox, etc.

In another embodiment, the advertiser computing device 2008 can communicate with the computer network 2010 in order to transmit and receive data that can be relayed to the advertisement creation and management module 46. For example, the advertiser computing device 2008 can be the personal computer of the advertiser and be connected to the computer network 2010 such as the Internet, and further, be in communication with a server hosting the advertisement creation and management module 46. As such, the advertiser can communicate and manage advertisements that the advertiser wishes to deliver to users.

Examples of the telephone network can be, for example, a public switch telephone network. In another example, the telephone network 2004 can be a cellular network. In yet another example, the telephone network 2004 can be a hybrid network of a cellular network and a public switch telephone network, etc.

In one embodiment, the computer network 2010 can be the Internet. In yet another embodiment, the computer network 2010 can be an intranet. Moreover, the advertiser computing device 2008 can be a laptop computer, a desktop computer or any other computing device through which an advertiser can communicate with a computer network 2010. Furthermore, the advertiser telephonic device 2002 can be, for example, a cellular phone. In another embodiment, the advertiser telephonic device 2002 can be a pay phone. In yet another embodiment, the advertiser telephonic device 2002 can be a telephone at the advertiser's place of business.

Figure 21:
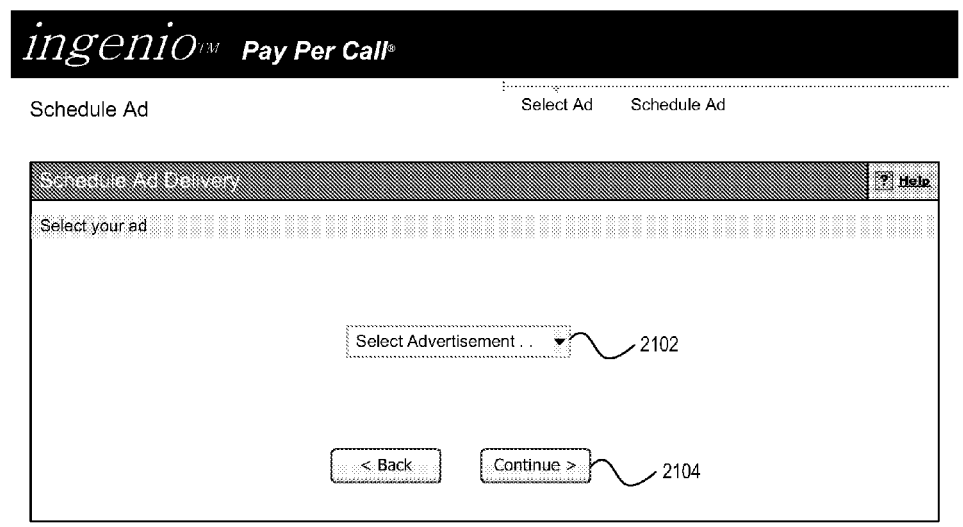
FIG. 21 illustrates an example of a user interface for an advertiser to select advertisement.

FIG. 21 illustrates an example of a user interface for an advertiser to select an advertisement. The screenshot 2100 can be presented to a user upon the user selecting to change the scheduling or delivery status of an advertisement. The user interface 2100 permits an advertiser 16 to select the advertisement to be managed or edited. A drop-down menu 2102 can be provided to permit an advertiser to select an advertisement from a group of advertisements that the advertiser has created. For example, if the advertiser 16 has created Advertisement 1, Advertisement 2 and Advertisement 3, the drop-down menu 2102 can display three advertisements. Thus, the advertiser can select out of the three advertisements for management.

In another embodiment, the advertisements can be provided in a list with checkboxes next to each advertisement so as to provide the advertiser an option to select the advertisements to be edited by selecting the checkbox corresponding to the advertisement. A button 2104 can be provided to permit the user or advertiser to continue to the next screen for editing and managing the selected advertisement.

Further embodiments may exist that do not utilize a user interface, but rather permit advertisers to interact with telephonic user interfaces that are not graphical user interfaces. For example, as previously discussed, an advertiser can be permitted to select an advertisement through a sequence of many options that are provided through an automated voice recognition system in an advertisement creation and management module 46. In addition, a telephone user interface can also include a menu option that requires entering DTMF input to select an advertisement from the group of advertisements.

FIG. 22 illustrates an example of a user interface for an advertiser to set an advertisement schedule. The advertisement schedule can include callable hours at which an advertiser is available to receive calls from customers. The callable hours can be utilized to determine the time at which advertisements are delivered, or to prioritize advertisements. In addition, the callable hours can also be utilized to determine whether calls are routed to the advertiser.

A callable hour input 902 can include one or more drop down menus that permit an advertiser 108 to set a period of time at which the advertisements can be delivered to customers. For example, the advertiser 108 can have hours of operation from 8:00 A.M. to 5:00 P.M. Monday through Friday. The advertiser 108 may want to advertise only during business hours such that customer calls are received during the hours of operation. As such, the callable period input 702 can be provided with drop-down menus for selecting a starting time and an ending time within a day. In another embodiment, other time periods can be specified. For example, a callable time period starting on Monday at 8 A.M. and ending on Friday at 5 P.M. can be set for advertiser availability.

In addition, the advertisement creation and management module 46 can be configured to deliver advertisement at times at which are appropriate to call a customer. For example, audio advertisements can only be delivered during the day, from 9 A.M. to 5 P.M.

Figure 23A:
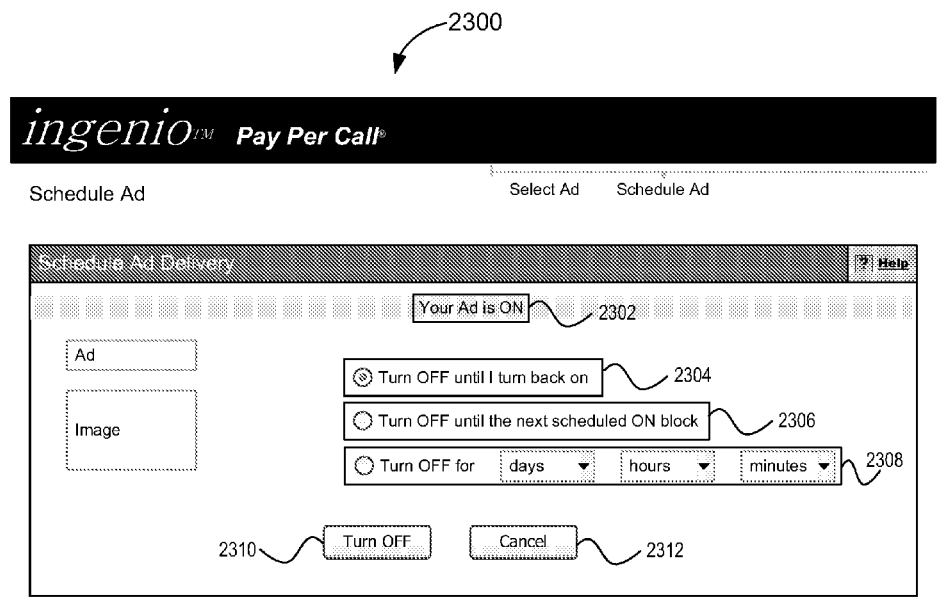
FIG. 23A illustrates an example of a user interface for an advertiser to deactivate an advertisement.

FIG. 23A illustrates an example of a user interface for an advertiser to deactivate an advertisement. Once the advertiser 16 has selected the advertisement to be managed, the advertiser can be provided with user interface 2300 that includes various options for activating an advertisement. User interface 2300 displays a user interface in a use-case scenario where the advertisement selected by the advertiser 116 has a status of "activated" or turned on. An indication of the status can be provided at indicator 2302. Indicator 2302 indicates that the advertisement selected by the advertiser is on. Therefore, the advertisement has been delivered to customers according to a schedule provided by the advertiser, or has been provided to customers continuously without any schedule. In one embodiment, when an advertiser activates an advertisement, or a group of advertisements, the advertiser is indicating that the advertiser is available to receive calls originally from the advertisement. In another embodiment, when an advertiser activates an advertisement, the advertiser activates delivery of the advertisement.

User interface 2300 permits the advertiser to turn off the advertisement such that delivery of the advertisement stops. In addition, once the advertisement is turned off, the system can optionally be configured to only route calls to the advertiser if the call received is associated with a telephone number that was included in the advertisement that is being turned off. In one example, if an advertiser turns off an advertisement from 7:00 A.M. to 10:00 A.M., no advertisements are delivered to any users from 7:00 A.M. to 10:00 A.M. However, a user may still call during that period as a result of an advertisement that the user had previously seen in connection with the advertiser. Therefore, if a call is received from 7:00 A.M. to 10:00 A.M., the call can be also received and not rerouted to the advertiser since the advertiser indicated that no delivery of advertisements are to be made during that time. Consequentially, the intention of the advertiser was further not to receive any calls at that time, namely 7:00 A.M. to 10:00 A.M.

The user interface 2300 provides multiple selections of the type of the activation that the advertiser wants to establish for the selected advertisement. For example, option 2304 permits an advertiser to turn off the advertisement until the advertiser turns the advertisement back on. Option 2306 permits the advertiser to turn off the advertisement until the next scheduled ON block of the selected advertisement. Furthermore, option 2308 permits an advertiser to turn off the advertisement for a specific number of days, hours, minutes or a combination thereof. Options 2304, 2306 and 2308 are provided in the user interface 2300 to be selected via a radio button interface. Other interfaces can also be provided, such as drop-down menus, checkboxes, buttons, etc. Furthermore, a button 2310 can be provided to execute the turn-off command once the advertiser has selected the option preferred by the advertiser. If the advertiser decides not to execute any of the options, the advertiser 16 can select a cancel button 2312.

In one embodiment, option 2304 permits the advertiser to indefinitely deactivate the advertisement such that no further advertisements are delivered to any users in which the advertisement is the selected advertisement, as illustrated in FIG. 22. This option would permit an advertiser to overwrite any scheduled ON blocks or OFF blocks such that the advertisement is turned off completely. Thus, unless the advertiser expressly turns on the advertisement again, the advertisement can remain deactivated or turned off.

In another embodiment, option 2306 permits an advertiser to deactivate or turn off the advertisement until a schedule turns the advertisement back on. As such, option 2306 is a partial override of a pre-defined schedule, such as a weekly schedule. Option 2306 permits an advertiser to turn off the advertisement for a current OFF block on time and be re-activated upon reaching the OFF block, as dictated by the schedule. For example, if a schedule calls for ON blocks on Monday and Tuesday from 7:00 A.M. to 4:00 P.M. on Monday and 7:00 A.M. to 4:00 P.M. on Tuesday, the advertisement can be provided to customers during those times. If, on any given Monday, the advertiser selects option 2306 in order to turn off the advertisement at, for example, 1:00 P.M., the advertisement is deactivated and no further advertisements are delivered. This can be useful, for example, when an advertiser wishes to close by 1:00 P.M. on that Monday, and does not want to advertise any further during that day, and, in addition, the advertiser also wishes to automatically continue the next day at the normal weekly schedule previously established by the advertiser. Option 2306 permits the advertiser to continue to use the normal weekly schedule that can re-activate on Tuesday morning at 7:00 A.M.

In another embodiment, option 2308 permits an advertiser to deactivate or turn off an advertisement for a specific number of days, a specific number of hours or a specific number of minutes. In one example, the advertiser may decide to turn off the advertisement delivery for fifteen minutes. In another embodiment, the advertiser may decide to turn off the advertisement for two hours. In yet another embodiment, the advertiser may decide to deactivate or turn off the advertisement for two days while the advertiser is at a conference. Once the time indicated by option 2308 has elapsed, the normal pre-defined schedule can then be used again for scheduling of advertisement delivery.

Figure 23B:
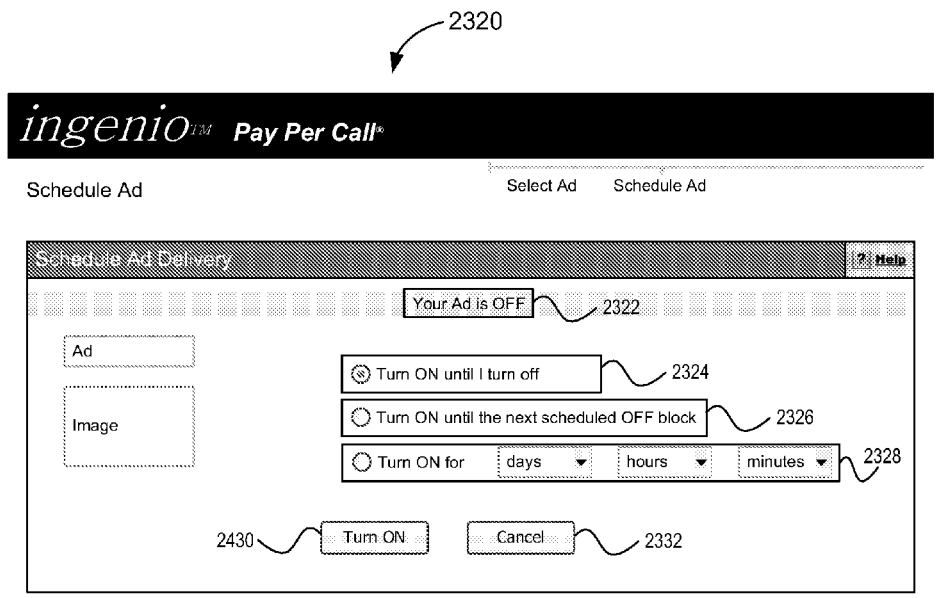
FIG. 23B illustrates an example of a user interface for an advertiser to activate an advertisement.

FIG. 23B illustrates an example of a user interface for an advertiser to activate an advertisement. Once an advertisement has been selected, at drop-down menu 2102, the status of the advertisement is determined and displayed at user interface 2300 or user interface 2320. If the advertisement is deactivated or turned off user interface 2320 can be presented to the advertiser in order for the advertiser to manage the advertisement. User interface 2320 provides an indicator 2322 that indicates to an advertiser that the advertisement is off or inactive. The advertiser is further provided with option 2324, option 2326 and option 2328 in order to turn on the advertisement according to different preferences of the advertiser. For example, option 2324 permits the advertiser to turn the advertisement on until the advertiser turns the advertisement off. As previously discussed, this option permits an advertiser to indefinitely turn on an advertisement such that the advertiser can receive customer calls indefinitely. Also, once the advertisement has been turned on, further functions and operations can also be additionally executed. In one example, advertisements are continuously delivered to customers. In another example, any call from a customer that has resulted from delivering the advertisement can then be connected to the advertiser since the advertiser has selected the advertisement to be on. In another example, once the advertisement has been turned off by the advertiser, any calls that are received that are to be routed to the advertiser 16 are either not answered, rejected or sent to a voicemail system that can be accessed by the advertiser later. These calls are not routed to the advertiser as a consequence of the advertiser selecting that the advertisement be inactive.

Option 2326 permits an advertiser to turn the advertisement on until the next scheduled OFF block. As such, in one example, the advertiser could have scheduled advertisements to be delivered on Monday from 7:00 A.M. to 10:00 A.M., and on Tuesday from 7:00 A.M. to 10:00 A.M. as well. If, for example, the advertiser decides that on Monday night a television show relevant to the advertiser's business is going to be broadcast, the advertiser can decide to turn on advertisements that are selected by the advertiser and relevant to the show. Therefore, the advertiser can select an advertisement that is relevant to the show and select option 2326 to turn on the advertisement. Thus, advertisements can be delivered to users as soon as the advertiser selects the advertisement to be activated. Thus, the advertisement can remain on for the entire night on Monday night, and continue on throughout the ON block that is scheduled on Tuesday from 7:00 A.M. to 10:00 A.M. At 10:00 A.M., however, because the advertisement is scheduled to be deactivated at 10:00 A.M. on Tuesday, the advertisement can be turned off according to the scheduled OFF block. The scheduling can then continue as normally scheduled until the advertiser provides another command such as turning off or on an advertisement or changing the pre-determined schedule.

Option 2328 further provides an advertiser the option of turning on the advertisement for a specific period of time. For example, the advertiser can select to turn on the advertisement for a specific number of days, a number of hours, a number of minutes or a combination of either or all of these three. In addition, a button 2430 can be provided to turn on the advertisement according to the option selected by the advertiser, namely option 2324, option 2326 or option 2328 upon pressing the button 2430, the command associated with the selected option can be executed. In addition, a cancel button 2332 can also be provided to the advertiser such that if the advertiser does not want to execute any of the options named above, then the advertisement can continue to be inactive or turned off.

Figure 24:
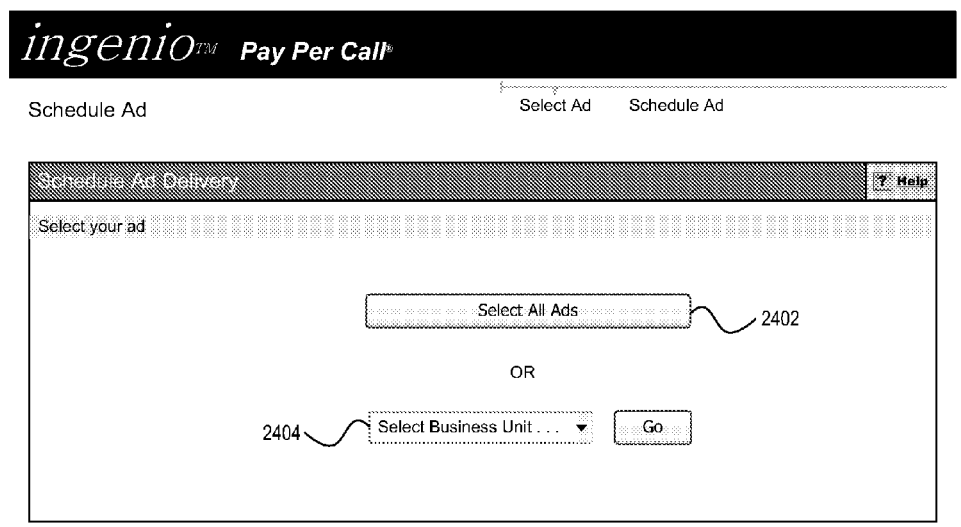
FIG. 24 illustrates an example of a user interface for an advertiser to select a group of advertisements.

FIG. 24 illustrates an example of a user interface for an advertiser to select a group of advertisements. User interface 2400 permits an advertiser to select a group of advertisements to be scheduled or to be turned off, or to be turned on. In one embodiment, the advertiser can be provided with a button 2402 that, when pressed, all of the advertisements associated with the advertiser are selected. For example, if the advertiser 16 has created four advertisements, such as Advertisement 1, Advertisement 2, Advertisement 3 and Advertisement 4, all of these advertisements can be selected by pressing button 2402. Once these advertisements are selected, options of turning on or turning off or setting a weekly or monthly schedule for the advertisements can be applied to each and every one of the advertisements created by the advertiser.

In another embodiment, a drop-down menu 2402 can be provided with a subset of advertisements that the advertiser has created. For example, the advertisements can be organized based on the business unit of the advertiser. If the advertiser is a large company that includes multiple business units, the advertiser can select advertisements only specific to a particular business unit for scheduling. As such, a first business unit may have different callable hours than a second business unit, even when the first business unit and the second business unit are within the same company.

In another embodiment, drop-down menu 2402 can include a list of groupings that the advertiser has previously configured. As such, the advertiser can group advertisements into one or more groups that are then listed under drop-down menu 2404 such that the scheduling can be applied to each subgroup independently of the others.

In yet another embodiment, a button or drop down menu or any other user interface mechanism can be provided for the user to select whether the user wants to turn off the selected group of advertisements or turn on the selected group of advertisements. In one embodiment, calls received and intended to be routed to the advertiser 16 can be filtered depending upon whether the advertisers are active or inactive. If the advertisements have been set to be inactive, the customer calls to advertisers can be recorded and not routed to the advertiser. In addition, the user interface mechanism 2406 can also permit the advertiser to select that the selected group of advertisements be activated.

Figure 25A:
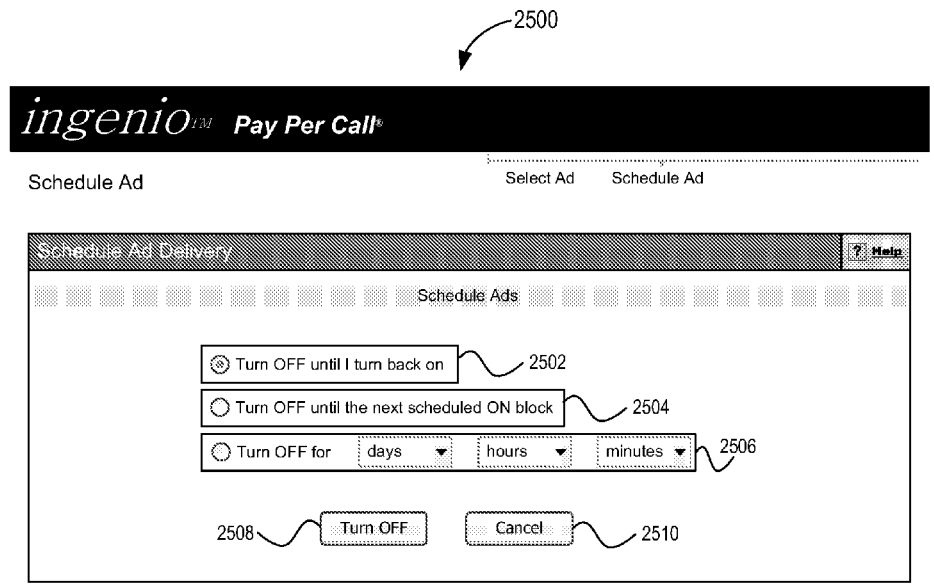
FIG. 25A illustrates an example of a user interface for an advertiser to deactivate a group of advertisements.

FIG. 25A illustrates an example of a user interface 2500 for an advertiser to activate a group of advertisements. In one embodiment, the advertiser can select a group of advertisements for scheduling delivery and publication of advertisements, turning on delivery and publication of advertisements, turning off delivery and publication of advertisements. Once a group is selected, the advertiser can be presented with the user interface 2500 that provides the advertiser with three options. In one embodiment, option 2502 permits the advertiser to schedule the selected advertisements to be turned off or deactivated until the advertiser activates one or more of the advertisements back on. Option 2502 permits an advertiser to turn off the selected advertisements regardless of whether the advertisements are activated or deactivated. For example, Advertisement 1, Advertisement 2, and Advertisement 3, may have had a status of active. In addition, Advertisement 4 may have had a status of inactive for a previously specified amount of time. However, upon the advertiser selecting all of the advertisements to be turned off, Advertisement 1, Advertisement 2, Advertisement 3, and Advertisement 4 can all be set to inactive and can not be reactivated until the advertiser activates them again.

In another embodiment, option 2504 permits an advertiser to turn off the selected advertisements until the next schedule ON block for each of the advertisements in the selected group. For example, Advertisement 1, and Advertisement 2 created by the advertiser 16 can have schedules for delivery of advertisements and publication of advertisements according to a weekly schedule or a monthly schedule. In addition, Advertisement 3, and Advertisement 4, can also be part of the group selected by the advertiser 16. Advertisements 3 and advertisement 4, however, do not have any scheduled periods of time for delivery of advertisements. Upon the advertiser turning off the advertisement based on option 2504, the advertisements can be turned off and only those advertisements with callable hour schedules handling can be reactivated upon the schedule of each of the advertisements reaching the block of activation. For example, Advertisement 1, and Advertisement 2, upon reaching the time of the next scheduled activation, can be reactivated and continue to be activated and reactivated according to the schedule for each of the advertisements.

In addition, another option can be offered to an advertiser in user interface 2500. Option 2506 permits an advertiser to select a predetermined amount of time for turning off the selected advertisements. In one embodiment, the predetermined amount of time corresponds to a number of days. In another embodiment, the predetermined amount of time corresponds to number of hours, and in another embodiment, the predetermined amount of time corresponds to a number of minutes. Once the period that the advertiser selects have elapsed, the status of each of the advertisements in the group of advertisements can return to the initial stage at which the advertisements initially were such that each of the advertisements can return to a different status. As explained above, the advertiser can also be provided with a cancel button 2510 in case the advertiser does not want to pursue any of the turn off options provided in interface 2500. In addition, a button 2508 can also be provided to execute the selected option, namely option 2502, option 2504 or option 2506.

Figure 25B:
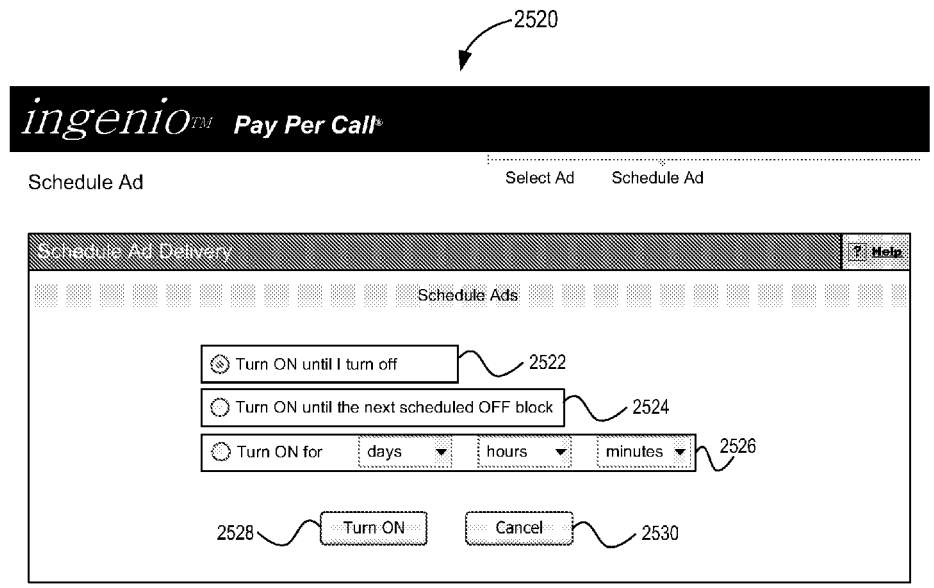
FIG. 25B illustrates an example of a user interface for an advertiser to activate a group of advertisements.

FIG. 25B illustrates an example of a user interface for an advertiser to activate a group of advertisements. In one embodiment, user interface 2520 provides similar options as user interface 2500. However, user interface 2520 corresponds to options for an advertiser to turn on a group of advertisements.

Interface 2520 can provide one or more options for turning on the group of advertisements. In one embodiment, interface 2520 provides three options to turn on the selected group of advertisements. The first option, option 2522, provides an advertiser the opportunity to turn on all of the advertisements until the advertiser turns the advertisements off, or at least until the advertiser turns one or more of the selected group of advertisements off.

The second option, option 2524, allows the advertiser to turn on the selected group of advertisements until the next scheduled OFF block. Only those advertisements in the group of selected advertisements that have a scheduled OFF block can be scheduled to be inactive upon reaching the scheduled time for each of the advertisements. Those advertisements that do not have a scheduled OFF block can be, for example, active until the advertiser changes the status of the advertisement.

In addition, option 2526 also provides the opportunity to an advertiser to turn on the group of advertisements for a specific number of days, hours or minutes, as well as a combination thereof. Finally, option 2528 permits an advertiser to execute the turn on command of the option selected by the advertiser. Additionally, a cancel button 2530 can also be provided in case the advertiser decides not to pursue any of the options of turning on the group of advertisements.

Figure 26:
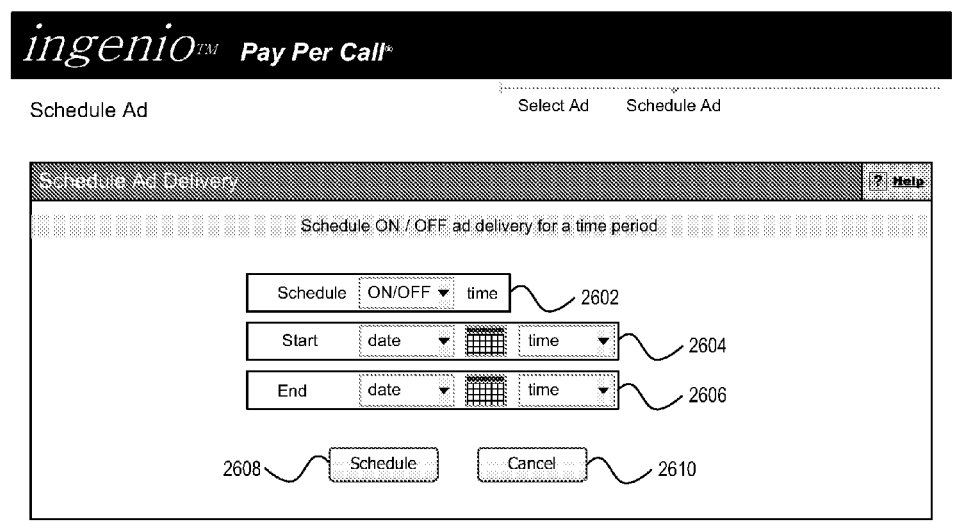
FIG. 26 illustrates an example of a user interface for an advertiser to activate or deactivate an advertisement or a group of advertisements.

FIG. 26 illustrates an example of a user interface for an advertiser to activate or deactivate an advertisement or a group of advertisements. User interface 2600 can provide the option of scheduling an ON block or an OFF block according to a select option 2602. After the advertiser selects whether the advertiser wants to schedule an on time or an off time, the advertiser can select the start date and time according to a selection 2604. For example, in selection 2604, a drop down menu for indicating the date and a calendar can also be provided for selecting a specific day of the week, or desired date. In addition, a drop down menu for a breakdown of time by the hour can also be provided for the advertiser to be able to indicate a start time. In addition, a selection mechanism 2606 can be provided for the advertiser to select the end date and end time of the period for advertisement delivery and call routing. In one embodiment, a selection mechanism is provided to allow an advertiser to specify a schedule at the granular level down to the minutes to allow fine control over the display or callable schedules.

Furthermore, a schedule button 2608 can also be provided to execute the scheduling of advertisement delivery and call routing once the period of time has been selected. Of course, a cancel button 2610 can be provided in case the advertiser decides not to schedule an off time or an on time according to a specified period of time. Each of the above describes mechanisms for selecting activation of an advertisement or deactivation of an advertisement, as well as establishing a schedule for activation and deactivation of an advertisement can be provided to a user in one or more user interface forms. The user interfaces provided above as screen shots of a graphical user interface are only exemplary user interfaces that can be utilized in a web browser, a user application, or any other computer program that can interact with a user through a user interface and that can be installed in a computer such as a computing device 2008 or 2102.

Other user interface mechanisms can also be provided to the user for selecting time for advertisement delivery and call routing. For example, user interfaces discussed above can include voice recognition systems that are operated through a telephone system or any other voice command system. In another embodiment, another user interface can be provided by a telephone or a portable device wherein the advertiser can enter DTMF tones to input data and any other selections. In yet another embodiment, it is also contemplated that an advertiser can utilize a live operator to schedule on time, off time or a predetermined weekly schedule or monthly schedule for a group of advertisements or an advertisement alone.

Figure 27A:
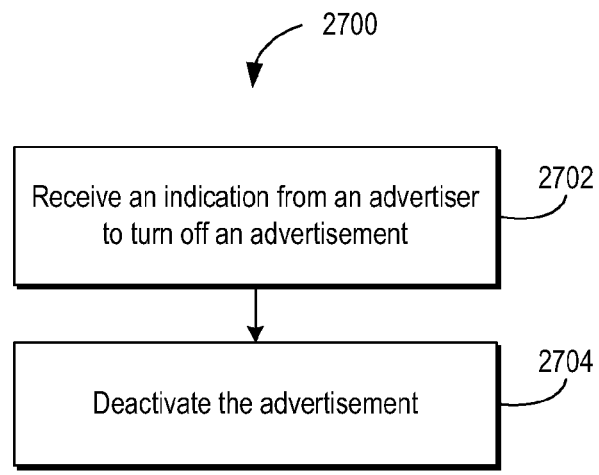
FIG. 27A illustrates a flow diagram of a process for deactivating an advertisement.

FIG. 27A illustrates a flow diagram of a process for deactivating an advertisement. At process block 2702, an indication is received from an advertiser to turn off an advertisement. Process 2700 continues to process blocks 2704. At process block 2704, the advertisement is deactivated. In one embodiment, the indication is to instruct the system to turn off the advertisement as soon as the indication is received by the system. In one embodiment, the indication is to instruction the system to turn off the advertisement at a specified time instance. In one embodiment, the indication includes a reoccurrence schedule that instructs the system to turn off the advertisement at a set of reoccurring time instances (if the advertisement is not already turned off).

Figure 27B:
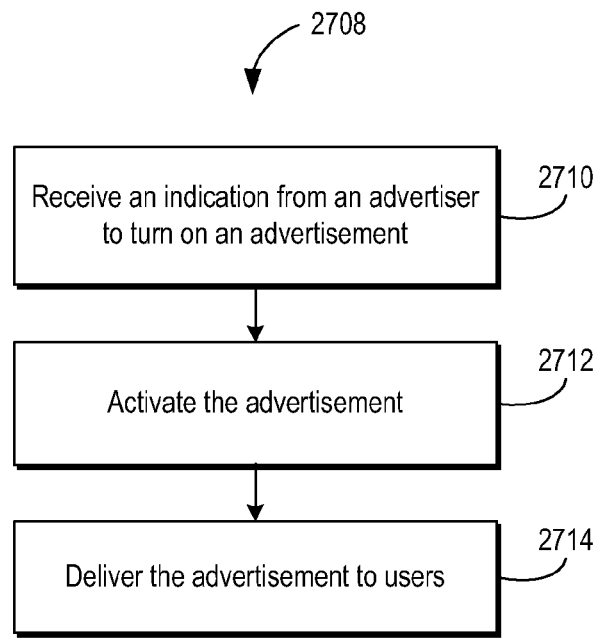
FIG. 27B illustrates a flow diagram of a process for activating an advertisement.

FIG. 27B illustrates flow diagram of a process for activating an advertisement. At process block 2710, an indication from an advertiser to turn on an advertisement is received. Process 2708 continues to process block 2712. At process block 2712, the advertisement is activated. Process 2708 continues to process block 2714. At process block 2714, the advertisement is delivered to one or more users. In one embodiment, the indication is to instruct the system to turn on the advertisement as soon as the indication is received by the system. In one embodiment, the indication is to instruction the system to turn on the advertisement at a specified time instance. In one embodiment, the indication includes a reoccurrence schedule that instructs the system to turn on the advertisement at a set of reoccurring time instances (if the advertisement is not already turned on).

Figure 28A:
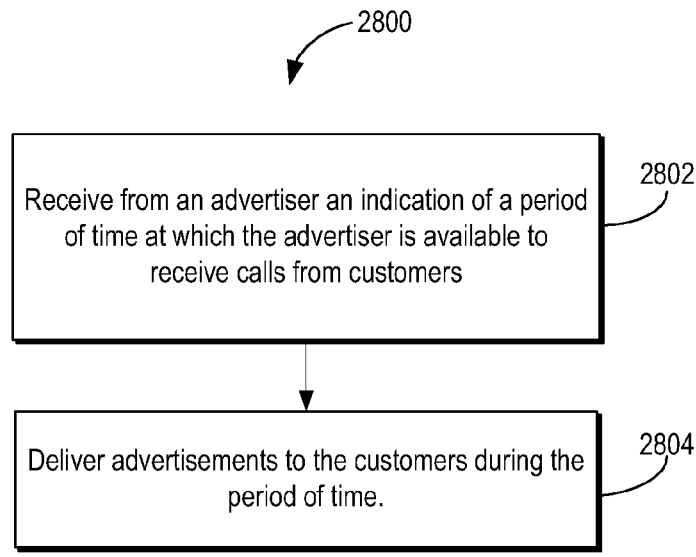
FIGS. 28A-28B illustrate a flow diagram of a process for an advertiser to set callable hours.

FIG. 28A illustrates a flow diagram of a process 2800 for an advertiser to set callable hours. At process block 2802, an indication of a period of time at which the advertiser is to receive calls from customers is received from the advertiser. In one embodiment, the indication further includes information on real time availability of the advertiser to receive calls generated from the advertisement of the advertiser. The advertiser can set the period of availability to be the hours of operation of the advertiser, or any other period. Process 2800 continues to process block 2804. At process block 2802, advertisements are delivered to users during the period of time indicated by the advertiser.

Figure 28B:
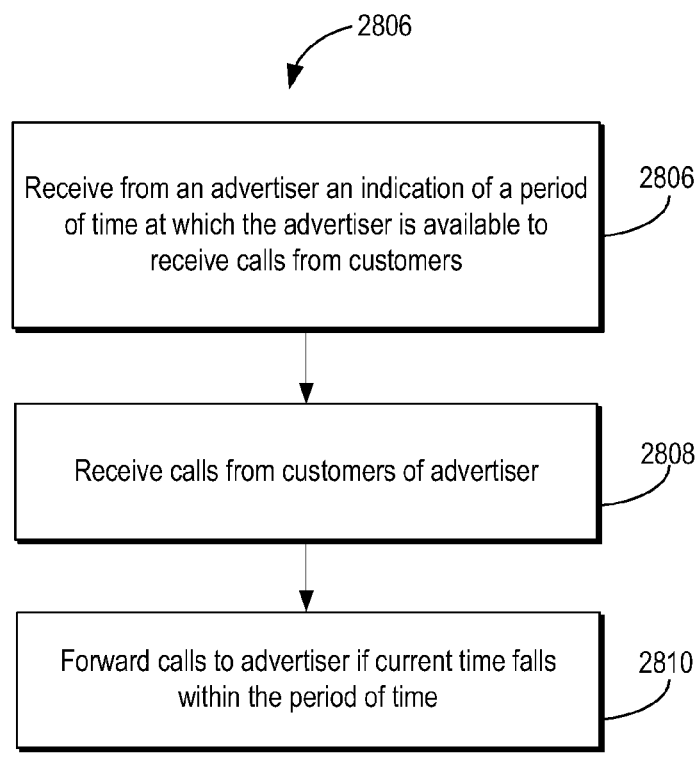

FIG. 28B illustrates a flow diagram of a process 2806 for an advertiser to set callable hours. At process block 2808, an indication of a period of time at which the advertiser is scheduled to be available to receive calls from customers is received from the advertiser. In one example, the advertiser sets the period of availability to be the hours of operation of the advertiser, or any other period. Process 2806 continues to process block 2808. At process block 2808, calls are received from a customer of the advertiser. The calls received from the customers can be in response to previous advertisement delivered to the customer. Process 2806 continues to process block 2810. At process block 2810, the calls received from the customers are forwarded to the advertiser if the current time falls within the callable time period previously set by the advertiser. For example, if the callable period set by the advertiser is 8 A.M. to 5 P.M., and a call is received at 6 P.M., the call would not be connected/forwarded to the advertiser because the current time, which would be only a few seconds after the call is received, does not fall within the callable period. On the other hand, if the call is received a 9 A.M., the call would be forwarded to the advertiser since the time of the call falls within the callable period of time.

Figure 29:
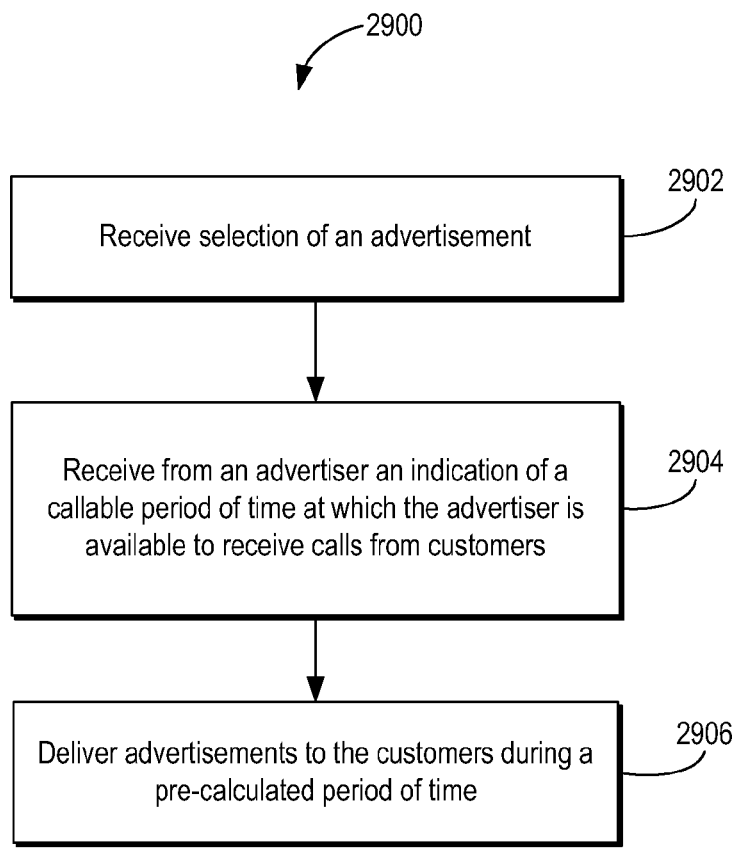
FIG. 29 illustrates a flow diagram of a process for delivering an advertisement during predetermined period of time.

FIG. 29 illustrates a flow diagram of a process for delivering an advertisement during predetermined period of time. At process block 2902 a selection of an advertisement is first received from an advertiser. Process 2900 continues to process block 2904. At process block 2904, an indication of a callable period of time at which the advertiser is available to receive calls from customer is received from an advertiser. Process 2900 continues to process block 2906. At process block 2906 advertisements are delivered to customers during a pre-calculated period of time. The pre-calculated period of time for advertisement delivery can be calculated based on the callable period of time established by the advertiser. In one embodiment, the pre-calculated period of time is a shifted period of time in relation to the callable period of time in order to allow a delay time between customers receiving and advertisement and making a call to the advertised telephone number. For example, if the callable period set by the advertiser is 12 P.M. to 5 P.M., the pre-calculated period of time can be a shifted period of time calculated to be 11 A.M. to 4 P.M. Thus, the shifting allows a one-hour delay to take into account the time between the time at which the advertisement is delivered, and the time at which the customer call is received. In other examples, the shifting time can be ten minutes, twenty minutes, thirty minutes, etc.

In one embodiment, a schedule can control whether an advertisement is presentable (e.g., returned in response to a query, or displayable) and/or can control whether, based on the schedule, a call as a response to the advertisement can be routed (e.g., forwarded or connected) to the advertiser, or to a specific telephone number of the advertiser (Callable). The callable and presentable aspects of an advertisement can be managed separately or together (e.g., via separate schedules or based on a common schedule). For example, the callable and presentable aspects can be managed separately with two separate schedules for callable hours and displayable hours. In another example, one business hour schedule is used to derive both displayable hours and callable hours. In one example, the displayable hours are the same as callable hours.

In one embodiment, separate schedules can also be specified for the advertisement delivered via different media channels, or different types of media channels. For example, an advertiser can set up a schedule that controls the display of the advertisement on one web site and another schedule that controls the display of the advertisement on anther web site. For example, an advertiser can set up a schedule based on whether the advertisement is to be presented via a phone or via a web site. For example, different schedules can specify different presentable hours for an advertisement presented on telephone-based directories, on radio, on television, on web, etc. Further, in one embodiment, separate schedules can be used to specify different callable hours for calls generated from the advertisement delivered via different media channels, or different types of media channels.

Figure 30A:
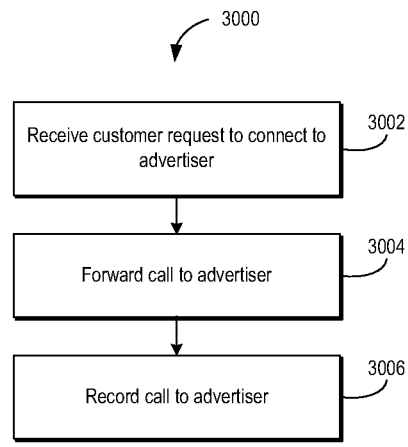
FIGS. 30A-30B illustrate a flow diagram of a process for call handling.

FIG. 30A illustrates a flow diagram of a process for call handling. At process block 3002, a request to connect to the advertiser is received from a customer. Process log 3000 continues to process block 3004. At process block 3004, the call is forwarded to the advertiser. The call can be forwarded to the advertiser independent of whether the advertisement related to the advertiser is off or on or activated or deactivated. In other words, the activation or deactivation of an advertisement only reflects whether the advertisement is going to be delivered or published to users. However, calls can still be routed to an advertiser if the advertiser wishes to have calls routed independently of advertisement delivery.

Figure 30B:
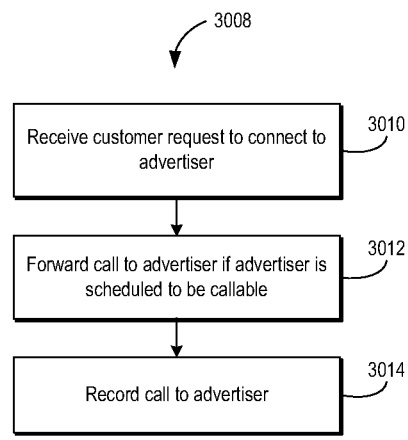

FIG. 30B illustrates a flow diagram of a process of call handling. At process block 3010, a request to connect to the advertiser is received from a customer. The request can be in the form of an incoming telephone call that requires to be connected to an advertiser. Process 3008 continues at process block 3012. At process block 3012, the call is forwarded to the advertiser only if the advertisement is scheduled to be callable. In other words, if the advertisement is set to be active during that time such that the calls related to the advertisement are routed to the advertiser, then the incoming call can be forwarded to the advertiser. Otherwise, the incoming call can be routed to the voice mail system or simply not answered at all. Process 3008 continues at process block 3014. At process block 3014, the call to the advertiser is recorded for later charging to the advertiser for pay per call advertisement as discussed herein.

In one embodiment, the schedule information of the advertiser is used to schedule the delivery of advertisements which are billed based on the telephone calls generated from advertisements. The callable hours specified by the advertisers are used to prioritize or schedule the delivery of advertisements over various media, such as web site, instant messages, SMS messages, emails, WAP etc. The callable hours can also be used to schedule or prioritize the delivery of advertisements for which the advertisements are billed for real time communications generated from the advertisements. The real time communications may include one or more of voice, image, video, message, etc. The advertisers may specify pay per real time communication session provided as a result of advertising. Different types of real time media connections, such as voice, video, messaging, etc., may be priced differently for an advertisement for separate connections, or priced as a package which includes the options of a combination of media types.

In general, the routines executed to implement different embodiments, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art can appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

What is claimed is:

1. A method, comprising:
    establishing, by a server system, a communication connection between caller and a callee based at least in part on a Voice over Internet Protocol connection and via a communication reference embedded in an advertisement that is presented on behalf of the callee;
    processing identification information received by the server system to determine an attribute of the caller based at least in part on the identification information, the attribute of the caller based at least in part on an identity of the caller or an anonymity of the caller;
    processing by the server system an indication of a previously stored preference associated with the callee pertaining to charging callers and/or not charging callers;
    based at least in part on i) the attribute of the caller and ii) the indication of the previously stored preference associated with the callee, determining by the server system whether to initiate an authentication process to authenticate the caller by determining whether a first condition exists or a second condition exists, where:
        upon determining existence of the first condition based at least in part on i) the attribute of the caller and ii) the indication of the previously stored preference associated with the callee, the server system initiates the authentication process to authenticate the caller;
        upon determining existence of the second condition based least in part on i) the attribute of the caller and ii) the indication of the previously stored preference associated with the callee, the server system does not charge the caller for a first period of time;
    billing, by the server system, the callee for the advertisement in response to the communication connection being established via the communication reference;
    monitoring, by the server system, the communication connection between the caller and the callee to detect a first pre-defined indication provided by the caller;
    charging, by the server system, the caller, on behalf of the callee, for communications with the callee over the communication connection in response to a detected occurrence of the first pre-defined indication;
    processing, by the server system, a second pre-defined indication from a user device of the callee during the communication connection, wherein the second pre-defined indication corresponds to a user input made via a user interface of the callee; and
    stopping, by the server system, the charging of the caller for communication time over the communication connection in response to a detected occurrence of the second pre-defined indication provided by the callee.

2. The method of claim 1, wherein the caller is not charged a fee for the communication connection between the caller and the callee before the detected occurrence of the first pre-defined indication.

3. The method of claim 1, further comprising:
    assigning to the service provider the real time communication reference for inclusion in the second advertisement; and
    billing the service provider for the second advertisement based on the real time communication connection directed to the service provider via the real time communication reference.

4. The method of claim 3, wherein the real time communication connection comprises a telephone call.

5. The method of claim 4, further comprising:
    receiving the telephone call made via the real time communication reference from a prospective customer; and
    determining whether to connect the telephone call to the service provider based at least partially on the indication of the at least one first period of time.

6. The method of claim 1, wherein the indication of the at least one first period of time specifies a number of hours in a day.

7. The method of claim 1, wherein the indication of the at least one first period of time specifies a number of periods in a number of days.

8. The method of claim 1, wherein the indication of the at least one first period of time is specified on a periodic basis.

9. The method of claim 1, further comprising:
receiving a message from the service provider during a first time period that is specified by the indication of the at least one first period of time, the message indicating that the service provider is not to receive real time communications generated from advertising in a remaining portion of a first time period; and
managing delivery of a third advertisement for the service provider further according to the message.

10. The method of claim 9, wherein the indication of the at least one first period of time indicates time periods during which the service provider is not to receive real time communications generated from advertising; and said managing delivery of the advertisement comprises determining whether to deliver the third advertisement based at least partially on a relation between a time instant of advertising opportunity and the indication of the at least one first period of time.

11. The method of claim 9, wherein said managing delivery of the third advertisement comprises determining a priority of the advertisement for presentation at a time instance of opportunity for advertising.

12. The method of claim 1, wherein the at least one first period of time corresponds to a schedule of business hours of the service provider.

13. The method of claim 1, wherein the indication is received via one of a computer server hosting an Internet website or a telephone line by a live operator.

14. The method of claim 1, wherein the service provider is billed for the advertisement according to real time communications connected to the service provider via the advertisement.

15. The method of claim 1, wherein the at least one second period of time is calculated by shifting the at least one first period of time.

16. A system, comprising:
a server system comprising one or more servers and storing instructions that, when executed by the one or more servers, cause the server system to:
transmit a first transmission via a network to a first end-user device associated with a service provider to facilitate a user interface that prompts specification of at least one first period of time during which the service provider is available to provide services to customers via real time communication connections;
process a second transmission received from the via the network from the first end-user device to identify an indication of the at least one first period of time during which the service provider is available to provide services to customers via real time communication connections;
calculate at least one second period of time during which an advertisement of the service provider is available for delivery responsive to search requests, where the at least one second period of time is calculated based at least in part on the at least one first period of time, wherein the at least one first period of time during which the service provider is indicated as available to provide services via real time communications and the at least one second period of time are at least partly different in time;
process a third transmission received via the network, the third transmission corresponding to a key word search; based at least in part on the third transmission, identify, in response to the key word search, the advertisement of the service provider stored by the server system, wherein the advertisement is identified for potential delivery in a search result responsive to the key word search;
prior to delivery of the search result responsive to the key word search, determine, in response to a search request, whether to deliver the advertisement for the service provider, based at least in part on whether a time of delivery of the advertisement is within the at least one second period of time during which the advertisement of the service provider is available for delivery responsive to search requests;
consequent to a determination that the time of delivery of the advertisement is within the at least one second period of time, cause delivery of a second advertisement corresponding to the advertisement, the delivery responsive to the key word search during the at least one second period of time, the second advertisement comprising a real time communication reference which when used to request a real time communication connection facilitates a Voice over Internet Protocol connection; and
process a fourth transmission received by the server system from a second end-user device and made via the real time communication reference, and, responsive to the fourth transmission, establishing the real time communication connection.

17. The system of claim 16, further comprising:
a communication handling module;
wherein the advertisement contains a real time communication reference which when used to request the real time communication connection causes the communication handling module to determine a connection to the service provider.

18. The system of claim 17, wherein the real time communication reference comprises a telephone number which when dialed causes the communication handling module to receive a call and further connect the call to the service provider if the telephone number is dialed within a time period as specified by the indication of the at least one second period of time.

19. The system of claim 18, wherein the service provider is billed for the advertisement based on a number of calls connected to the service provider as a result of the advertisement.

20. One or more non-transitory, computer-readable medium having stored thereon a set of instructions which, when executed by a server system, cause the server system to:
transmit a first transmission via a network to a first end-user device associated with a service provider to facilitate a user interface that prompts specification of at least one first period of time during which the service provider is available to provide services to customers via real time communication connections;
process a second transmission received from the via the network from the first end-user device to identify an indication of the at least one first period of time during which the customer can communicate with the service provider to establish the real time communication link with the service provider for the provision of services to customers via real time communication connections;
calculate at least one second period of time during which an advertisement of the service provider is available for delivery responsive to search requests, where the at least one second period of time is calculated based at least partly on the at least one first period of time during which the service provider is indicated as available to provide services via real time communications, wherein the at least one first period of time and the at least one second period of time are at least partly different in time;

process a third transmission received via the network, the third transmission corresponding to a key word search;

based at least in part on the third transmission, identify, in response to a key word search, the advertisement of the service provider stored by the server system, wherein the advertisement is identified for potential delivery in a search result responsive to the key word search;

prior to delivery of the search result responsive to the key word search, determine whether to deliver the advertisement for the service provider in the search result, based at least partially on whether of delivery of the advertisement is within the at least one second period of time during which the advertisement of the service provider is indicated as available for delivery responsive to search requests;

consequent to a determination that the time of delivery of the advertisement is within the at least one second period of time, cause delivery of a second advertisement corresponding to the advertisement, the delivery responsive to the key word search during the at least one second period of time, the second advertisement comprising a real time communication reference which when used to request a real time communication connection facilitates a Voice over Internet Protocol connection; and processing a fourth transmission received by the server system from a second end-user device and made via the real time communication reference, and, responsive to the fourth transmission, establishing the real time communication connection.

\* \* \* \* \*